US009419933B2

(12) United States Patent
Thai

(10) Patent No.: US 9,419,933 B2
(45) Date of Patent: Aug. 16, 2016

(54) MAXIMIZING CIRCLE OF TRUST IN ONLINE SOCIAL NETWORKS

(71) Applicant: UNIVERSITY OF FLORIDA RESEARCH FOUNDATION, INCORPORATED, Gainesville, FL (US)

(72) Inventor: My T. Thai, Gainesville, FL (US)

(73) Assignee: University of Florida Research Foundation, Incorporated, Gainesville, FL (US)

( * ) Notice: Subject to any disclaimer, the term of this patent is extended or adjusted under 35 U.S.C. 154(b) by 435 days.

(21) Appl. No.: 13/895,900

(22) Filed: May 16, 2013

(65) Prior Publication Data

US 2013/0311582 A1 Nov. 21, 2013

Related U.S. Application Data

(60) Provisional application No. 61/648,657, filed on May 18, 2012.

(51) Int. Cl.
*G06F 17/30* (2006.01)
*H04L 12/58* (2006.01)
*G06Q 50/00* (2012.01)
*G06Q 10/10* (2012.01)

(52) U.S. Cl.
CPC ............. *H04L 51/32* (2013.01); *G06Q 10/107* (2013.01); *G06Q 50/01* (2013.01)

(58) Field of Classification Search
CPC ..... H04L 51/32; G06Q 50/01; G06F 21/6209
USPC ......................................................... 709/206
See application file for complete search history.

(56) References Cited

U.S. PATENT DOCUMENTS

| | | | |
|---|---|---|---|
| 8,682,995 B1* | 3/2014 | Lawler et al. | 709/207 |
| 2005/0246420 A1* | 11/2005 | Little, II | 709/204 |
| 2006/0085373 A1* | 4/2006 | Dhillion et al. | 707/1 |
| 2006/0117378 A1* | 6/2006 | Tam | G06F 21/10 726/3 |
| 2006/0173963 A1* | 8/2006 | Roseway et al. | 709/206 |
| 2006/0248573 A1* | 11/2006 | Pannu et al. | 726/1 |

(Continued)

OTHER PUBLICATIONS

Kairam, S., et al., "Talking in Circles: Selective Sharing in Google+", CHI 2012, ACM, 2012, 1065-1074.

(Continued)

*Primary Examiner* — Kevin Bates
*Assistant Examiner* — Mark A Scott
(74) *Attorney, Agent, or Firm* — Saliwanchik, Lloyd & Eisenschenk

(57) ABSTRACT

Methods are provided for constructing an on-the-fly circle of trust for a user of an online social network to enable the user to reduce the likelihood that information will be leaked to an unwanted target. In one embodiment, a maximum circle of trust is constructed by using an iterative greedy construction (IGC) algorithm with leakage estimation using disjoint cut-sets. In another embodiment, the maximum circle of trust is constructed by using the IGC algorithm with leakage estimation using a hybrid method where the initial CT is constructed using the disjoint cut-sets and then the neighbors not included in the CT are sorted in non-decreasing order of visibilities and then each of these neighbors is included in the CT one at a time while checking if the leakage is below a threshold using a Sampling algorithm. In yet another embodiment, randomized rounding is used to construct the maximum circle of trust.

10 Claims, 15 Drawing Sheets

(56) References Cited

U.S. PATENT DOCUMENTS

| | | | |
|---|---|---|---|
| 2007/0143128 A1* | 6/2007 | Tokarev | G06Q 10/10 705/347 |
| 2007/0143281 A1* | 6/2007 | Smirin et al. | 707/5 |
| 2008/0005064 A1* | 1/2008 | Sarukkai | G06F 17/241 |
| 2009/0094041 A1* | 4/2009 | Buss | G06Q 30/06 705/1.1 |
| 2009/0151002 A1* | 6/2009 | Zuniga | G06F 21/6209 726/27 |
| 2009/0288150 A1* | 11/2009 | Toomim | G06F 21/6218 726/5 |
| 2009/0313346 A1* | 12/2009 | Sood | G06Q 10/10 709/207 |
| 2009/0327484 A1* | 12/2009 | Chen | G06Q 10/107 709/224 |
| 2010/0082354 A1* | 4/2010 | Sundaresan | 705/1 |
| 2010/0107219 A1* | 4/2010 | Thompson | G06F 21/6218 726/2 |
| 2010/0250605 A1* | 9/2010 | Pamu | G06F 17/30533 707/783 |
| 2011/0295988 A1* | 12/2011 | Le Jouan | G06F 21/31 709/223 |
| 2012/0005209 A1* | 1/2012 | Rinearson | G06F 17/30908 707/737 |
| 2012/0246087 A1* | 9/2012 | Talati et al. | 705/319 |
| 2013/0019317 A1* | 1/2013 | Whelan | H04B 7/18593 726/26 |
| 2013/0091540 A1* | 4/2013 | Chen | H04L 63/08 726/1 |
| 2013/0091582 A1* | 4/2013 | Chen | G06Q 10/10 726/26 |
| 2013/0182848 A1* | 7/2013 | Sundaram | H04L 9/0833 380/277 |
| 2013/0198811 A1* | 8/2013 | Yu | H04L 63/08 726/4 |
| 2013/0297691 A1* | 11/2013 | Collins | G06Q 50/01 709/204 |
| 2014/0229487 A1* | 8/2014 | Mukund et al. | 707/740 |

OTHER PUBLICATIONS

Lam, I.-F., et al., "Involuntary Information Leakage in Social Network Services." Advances in Information and Computer Security. Springer Berlin Heidelberg, 2008. 167-183.

Ngoc, T.H., et al., "New Approach to Quantification of Privacy on Social Network Sites." Advanced Information Networking and Applications (AINA), 2010 24th IEEE International Conference on. IEEE, 2010, 556-564.

Nigusse, G., et al., "Privacy Codes of Practice for the Social Web: The Analysis of Existing Privacy Codes and Emerging Social-Centric Privacy Risks." AAAI Spring Symposium Series. 2010, 130-135.

\* cited by examiner

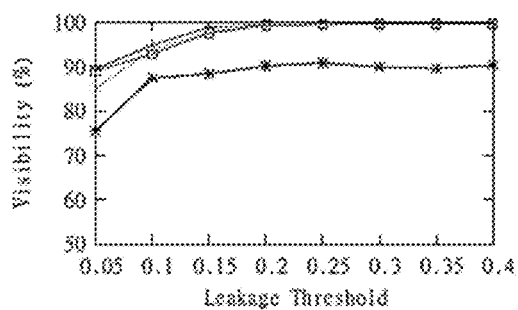
FIG. 5E
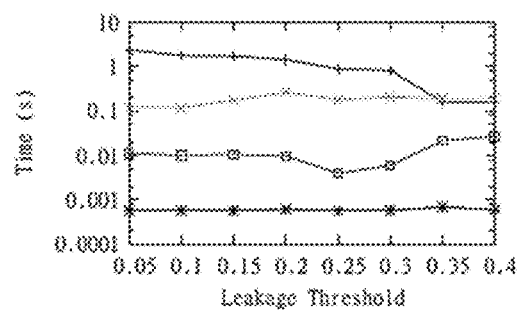
FIG. 5F
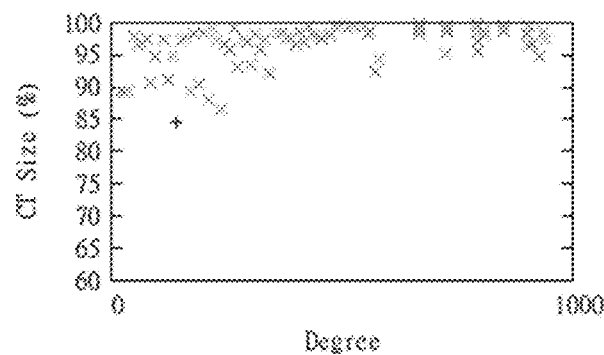
FIG. 6A
FIG. 6B

Algorithm 1: FPTAS for Single-2-MCT

Input : Directed graph $G$ with a tuple of probability $\langle a_{uv}, p_{uv} \rangle$ in each edge $(u, v)$, source user $s$, unwanted user $t$ and leakage probability $\tau$

Output: Circle of Trust $C$

1. $a_{si} \leftarrow an_{si}/ad_{si}$ for each $i$;
2. $Ad \leftarrow$ the least common multiple of all denominators $ad_{si}$;
   // Phase 1: Scaling
3. For some $\varepsilon > 0$, let $A \leftarrow \dfrac{\varepsilon \max\left\{\dfrac{an_{si}Ad}{ad_{si}} \mid a_{si}p_{it} \leq \tau\right\}}{S_n}$;
4. For each neighbor $i \in N(s)$, define $a'_{si} = \left\lfloor \dfrac{an_{si}}{A} \right\rfloor$;
   // Phase 2: Dynamic Programming
5. $A_u \leftarrow \sum_{i \in N(S) \setminus \{t\}} a'_{si}$;
6. $L(a) = A_u + 1$ for all integers $a$ less than $A_u$;
7. for $a \leftarrow 1$ to $S_n$ do
8.     Apply dynamic programming to find the CT $C$ using the recursion (1) to obtain $C_a$;
9. end
10. $C \leftarrow \arg\max_{1 \leq a \leq S_n}\{C_a | L(a) \leq \tau\}$;
11. return $C$;

FIG. 14A

Algorithm 2: PTAS for Bounded-2-MCT

Input : Directed graph $G$ with a tuple of probability $(a_{uv}, p_{uv})$ in each edge $(u, v)$, source user $s$, unwanted user $T$ and leakage probability $\tau_j$ for each $t_j \in T$
Output: Circle of Trust $C$ 1. $\beta \leftarrow \min\{\lceil \frac{k}{\epsilon} \rceil - (k + 1), |N(s) \setminus T|\}$;
2. $w_{ij} \leftarrow -\log(1 - p_{si}p_{it_j})$;
3. $c_j \leftarrow -\log(1 - \tau_j)$;
   // Phase 1
4. foreach $\Lambda \subset N(s) \setminus T$ *such that* $|\Lambda| < \beta$ do
5.     if $\sum_{i \in \Lambda} w_{ij} \leq c_j$ *for all* $j \in T$ then
6.         if $\sum_{i \in \Lambda} a_i > \pi^\varepsilon$ then
7.             $C \leftarrow \Lambda$;
8.         end
9.     end
10. end
    // Phase 2
11. foreach $\Omega \subset N(s) \setminus T$ *such that* $|\Omega| = \beta$ do
12.     if $\sum_{i \in \Omega} w_{ij} \leq c_j$ then
13.         Obtain the solution $C_\Omega^k$ of the subproblem with $N(s)' = \{j | c_j \leq \min\{c_i | i \in \Omega\}\} \setminus \Omega$ and $c_j' = \sum_{i \in \Omega} w_{ij}$ using Algorithm 3 ;
14.         if $\sum_{i \in \Omega \cup C_\Omega^k} a_i > \pi^\varepsilon$ then
15.             $C \leftarrow \Omega \cup C_\Omega^k$;
16.         end
17.     end
18. end
19. return $C$;

FIG. 14B

Algorithm 3: "Algorithm LP Rounding"

Input  : Directed graph $G$ with a tuple of probability $(a_{uv}, p_{uv})$ in each edge $(u, v)$, source user $s$, unwanted user $T$ and leakage probability $\tau_j$ for each $t_j \in T$
Output: Intermediate Circle of Trust $C_I$ 1 Obtain an optimal basic solution $x^{LP}$ by solving the LP (2) with $|\{i | 0 < x_i^{LP} < 1\}| \leq k$;
2 $I \leftarrow \{i | x_i^{LP} = 1\}$;
3 $F \leftarrow \{i | 0 < x_i^{LP} < 1\}$;
4 if $\sum_{i \in I} a_i > \max\{a_j | j \in F\}$ then
5 $\quad | \quad C_I \leftarrow I$;
6 end
7 else
8 $\quad | \quad C_I \leftarrow \{j\}$;
9 end
10 return $C_I$;

FIG. 14C

Algorithm 4: Randomized Rounding Algorithm

Input  : Directed graph $G$ with a tuple of probability $(a_{uv}, p_{uv})$ in each edge $(u, v)$, source user $s$, unwanted user $T$ and leakage probability $\tau_j$ for each $t_j \in T$
Output: Circle of Trust $C$ 1 Obtain a solution $x^{LP}$ by solving the LP (2) ;
2 $\mu \leftarrow \alpha(\pi_{LP}^*/k)^{1/(\hat{c}-1)}$;
3 Round each $x_i^I$ to 1 with probability $\mu x_i^L$;
4 $C \leftarrow \{i | x_i^I = 1\}$;
5 return $C$;

FIG. 14D

Algorithm 5: IGC Algorithm

```
   Input  : δ-MCT instance
   Output: A Circle of Trust C
 1 C ← ∅;
 2 L ← N(s) \ T;
   // Remove all unwanted targets with no risk
      of leakage
 3 foreach t_j ∈ T do
 4  |   if τ_j(L) < τ_j then
 5  |    |  T ← T \ {t_j};
 6  |   end
 7 end
 8 while ∀ℓ_j(C) < τ_j do
   |   // Update the set of candidate users L
 9  |   foreach v ∈ L do
10  |    |  if ∃j : ℓ_j(C + {v}) > τ_j then
11  |    |    |  L ← L \ {v};
12  |    |  end
13  |   end
14  |   Find v ∈ L that maximizes f(v);
15  |   C ← C ∪ {v};
16 end
17 return C
```

FIG. 14E

Algorithm 6: Disjoint Cutset Upper-bound

```
   Input  : Graph G = (V, E), s, t ∈ V, and probabilities q(u, v)
            for (u, v) ∈ E.
   Output: Bound on the leakage probability at t.
 1 foreach v ∈ V do
 2  |   Compute d(s, v) and d(v, t) the hop distance from s to v
        and from v to t, respectively;
 3 end
 4 Let d_0 = d(s, t);
 5 for i = 1 to d_0 do do
 6  |   C_i ← {(u, v) | d_s(u) = i ∧ d_s(u) + d_t(v) ≤ δ − 1}
 7 end
 8 return $1 - \Pi_{i=1}^{\delta}(1 - \Pi_{e \in C_i}(1 - q_e))$
```

FIG. 14F

Algorithm 7: Removal Greedy Algorithm

Input  : Directed graph $G$ with a tuple of probability $\langle a_{uv}, p_{uv} \rangle$ in each edge $(u, v)$, source user $s$, unwanted user $T$ and leakage probability $\tau_j$ for each $t_j \in T$
Output: Circle of Trust $C$ 1 $C \leftarrow N(s) \setminus T$;
2 while $\exists \tau_j(C) \geq \tau_j$ do
3      Find $v \in C$ using Monte Carlo Sampling which maximizes $f(v)$;
4      $C \leftarrow C \setminus \{v\}$;
5 end
6 return $C$;

FIG. 14G

MAXIMIZING CIRCLE OF TRUST IN ONLINE SOCIAL NETWORKS

BACKGROUND

Recent rapid development of Online Social Networks (OSNs) has revolutionized the way of human interaction and drastically changed the landscape of communications and information sharing. One of the most important characteristics of OSNs is the "word-of-mouth" exchanges, in which information can be propagated from friends to friends of friends and eventually widely spread over the network. By leveraging this power, many organizations and companies have been using OSNs as an effective medium to increase their visibility and advertise their products. Likewise, millions of OSN users are sharing their personal status daily with a hope to keep many of their friends, near or far, updated. However, millions of users are tweeting and sharing their personal status daily without being aware of where that information eventually travels to.

Indeed, not only is it possible to quickly propagate information to friends, this information may be spread to many unwanted targets (those with whom we do not want to share the information). For example, suppose that Bob wants to share with his friends some of his personal pictures and stories in Facebook, yet he is reluctant to let Chuck know about them. Being careful, Bob just shares to the list of his friends in Facebook where Chuck is not in that group with a belief that Chuck cannot see those pictures. Unfortunately, Alice, who is a friend of both Bob and Chuck, replied to the post, and thus Chuck will be able to see the message from Alice and learn about Bob's sharing.

Current OSN settings can address part of this issue. For example, Google+ groups users into circles such that a user can select a specific circle to share information with when the user shares a message. In addition, Facebook includes a function enabling customized privacy for each user when the user shares a message (referred to as "Custom Privacy"). In the Custom Privacy function, a user can choose a range of friends to share with and also hide the message from some specific users (including friends, friends of friends, or the public). Superficially, the information leakage problem appears to be addressed in the OSNs by these user-selected privacy controls. In particular, the Custom Privacy function works by tracking the message-ID associated with a post and hiding any post or thread having that message-ID from unwanted targets. However, the current approaches neglect an important channel of information propagation, namely, mentioning the message.

In the example with Bob and Chuck, Bob may use the custom privacy function provided by Facebook to hide his sharing from Chuck, which can help avoid the situation where Chuck see's Alice's reply to the post (and thus the pictures or post shared by Bob). Unfortunately, the custom privacy function only tracks and hides Alice's message based on the message-ID of Bob's post, not on its propagation. Therefore, when Bob's friend Alice posts a new message mentioning Bob's pictures and stories, this new message cannot be hidden from Chuck anymore since its ID is no longer the same as the original message from Bob. Consequently, Chuck will still learn about Bob's pictures and stories. Thus it raises a practical question: Is there any mechanism for Bob to share his pictures and stories to as many friends as possible without these pictures and stories reaching Chuck?

BRIEF SUMMARY

Techniques and systems are disclosed for controlling information leakage in online social networks such that dissemination of information is maximized while the probability that the information will reach an unwanted target is minimized.

In an embodiment of the invention, a system is provided for on-the-fly construction of a circle of trust. The system is configured to construct a circle of trust from a user's friend (or follower) list and the name(s) of unwanted target(s) who may or may not be part of the user's friend (or follower) list. The construction of the circle of trust can be additive or subtractive. In one embodiment, potential leakage to an unwanted target is estimated by performing a sampling method. In another embodiment, a non-sampling method is used. In yet another embodiment, a hybrid method is used, where the hybrid method involves a first phase using a non-sampling method and a second phase using a sampling method.

According to certain embodiments, a user can control the propagation of a message by having a circle of trust constructed at the time of posting a message, where the circle of trust is a subset of the user's friends selected such that the probability of the message reaching an unwanted target is below a particular probability threshold.

This Brief Summary is provided to introduce a selection of concepts in a simplified form that are further described below in the Detailed Description. This Brief Summary is not intended to identify key features or essential features of the claimed subject matter, nor is it intended to be used to limit the scope of the claimed subject matter.

BRIEF DESCRIPTION OF THE DRAWINGS

FIGS. 5E and 5F show the visibility and time results, respectively, of the six embodiments implemented on the Twitter dataset where $\delta=3$.

FIGS. 6A-6C show CT size for sources at different "celebrity" level (degree) for the Foursquare dataset (FIG. 6A), the Facebook dataset (FIG. 6B) and the Twitter dataset (FIG. 6C).

for the edges between $N_i$ and $t_j$, the probability $$p = 1 - e^{\frac{1}{3}}$$

and 0 for all other edges without specifically marked probability.)

Figure 12:
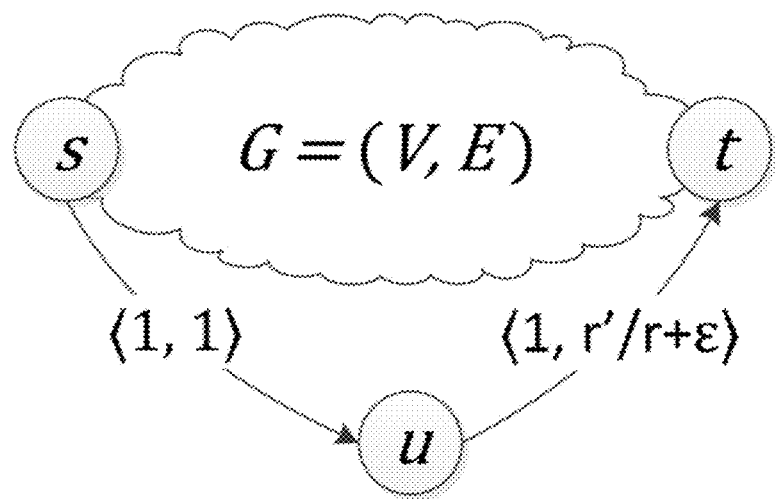

FIG. 12 illustrates a δ-MCT reduction.

Figure 13A:
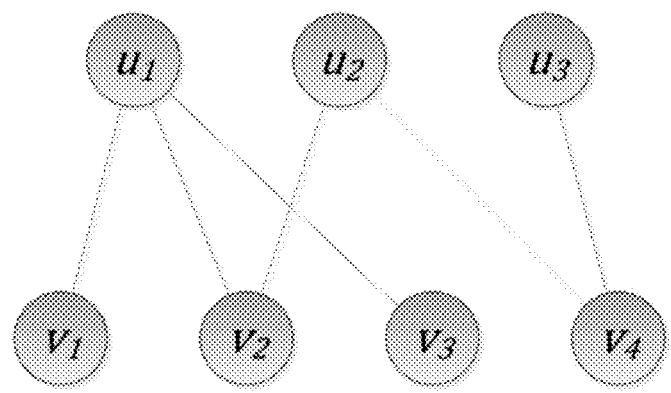
Figure 13B:
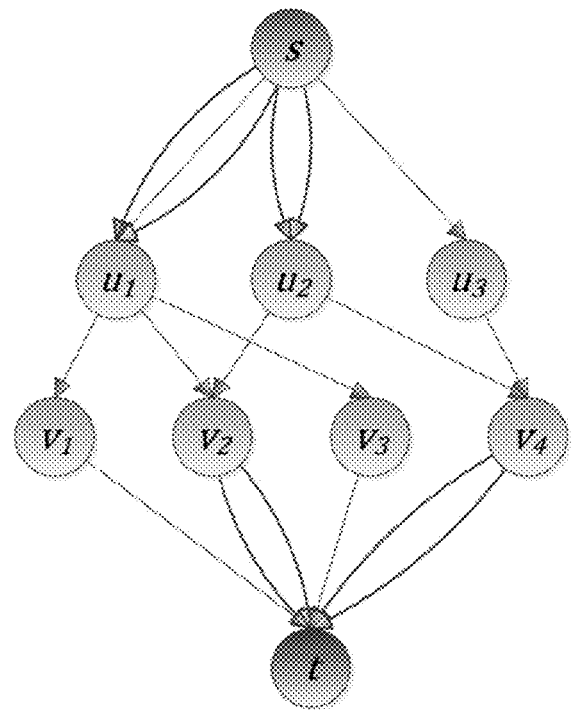
Figure 13C:
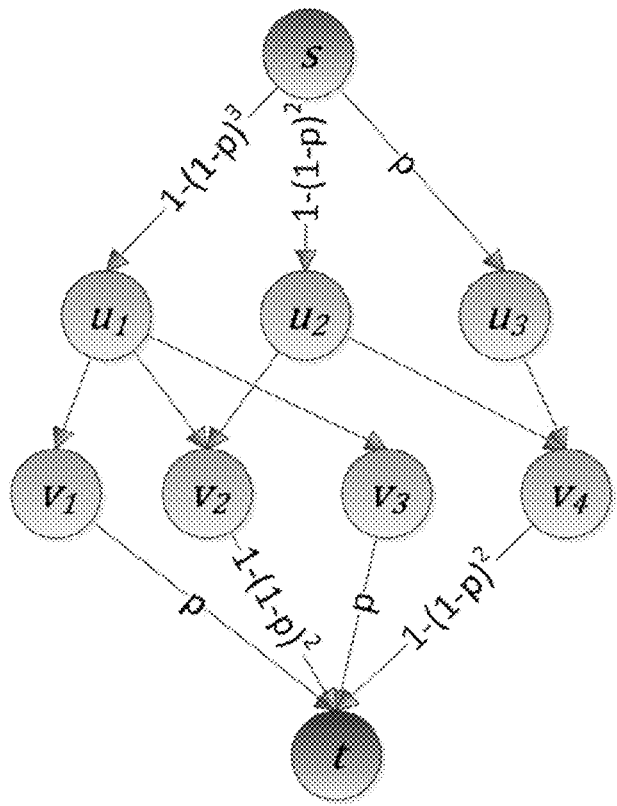

FIGS. 13A-13C illustrate an example of a 3-Conn$_2$ Reduction from an instance G (FIG. 13A) to a probabilistic graph H (FIG. 13B) to a Reduced graph G' (FIG. 13C).

FIGS. 14A-14G show Algorithms 1-7 that may be used in embodiments of the invention.

DETAILED DISCLOSURE

In order to accomplish the construction of a circle of trust, techniques are disclosed so that OSN users can conveniently and safely share their information in OSNs knowing that these information will not be propagated to their unwanted targets.

Figure 1:
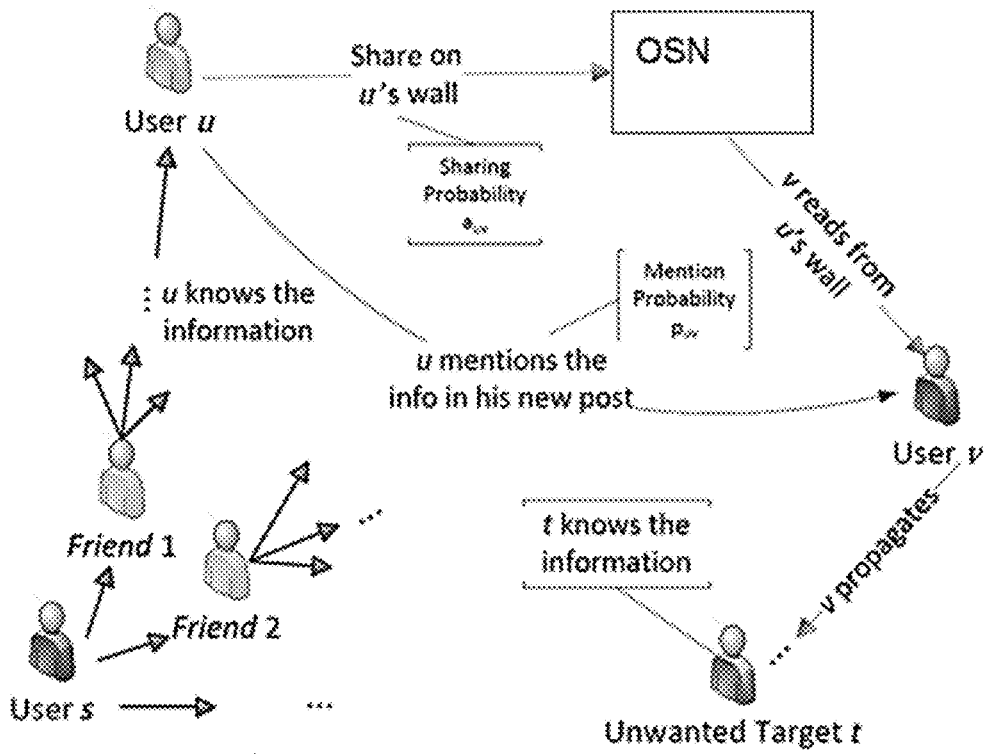
FIG. 1 shows a representation of a ISM Propagation Model in accordance with an embodiment of the invention.

FIG. 1 illustrates information propagation leakage in an OSN. This information propagation leakage follows an Independent Sharing-Mention (ISM) propagation model in the context of different diffusion channels. As shown in FIG. 1, in the ISM model, two types of information leakage propagations (e.g., diffusion channels) in OSNs are considered between two friends User u and User v. As previously mentioned, the ability for information to be propagated from friends to friends of friends and eventually widely spread over the network is desirable for OSNs. User u may acquire information from User s (who User u may not know) through the propagation of that information from friend to friend (via Friend 1 and/or Friend 2) until u learns of the information.

The first type of information leakage propagation channel is referred to as "sharing." For sharing, u can share a message using functions provided by OSNs. For example, u can use "retweet" or "reply" to share on Twitter and "share," "comment" or "like" to share on Facebook. When u shares a message, the message will appear on u's own wall and can then be seen by v.

The second type of information leakage propagation channel is referred to as a "mention." For a mention, u can also propagate the information to v by mentioning the message with the same content (or retyping using his own words).

Correspondingly, between users u and v, the probability of a sharing propagation (Sharing Probability) is $a_{uv}$ and the probability of a mention propagation (Mention Probability) is $p_{uv}$. Therefore, each link (u,v) in an OSN has a two-tuple probability $\langle a_{uv}, p_{uv} \rangle$. Although $a_{uv}$ and $p_{uv}$ are not necessarily independent, the ISM model is independent in terms of the following two aspects: the independence between different links; and the independence among the current propagation, the history propagation and the future propagation.

The leakage propagation process in a directed graph G (with edges E) is illustrated in FIG. 1. If a source User s shares a message m to a subset $C=\{v_1, v_2, \ldots, v_l\}$ of his friends, in a first round, a user v will learn about the message m with the sharing probability $a_{sv}$, i.e., there is no propagation via mentioning in the first round. In a second round, if friend v learns about the message m in the first round, then each friend w of User s's friend v can learn about the message m from friend v via sharing with probability $a_{vw}$ or via mentioning with probability $p_{vw}$. The propagation continues up to δ rounds, where δ>0 is a predefined integral constant in the model.

Based on the above described propagation process, a leakage path $(s=v_0, v_1, \ldots, v_l=t)$ is defined as a path between the source s and an unwanted target t, in which $(v_i, v_{i+1})$ and $v_{i+1}$ learns about the message m from $v_i$ for all i=0, 1, . . . , l−1. If friend $v_{i+1}$ learns about message m via sharing, then $(v_i, v_{i+1})$ is called a sharing edge, otherwise, $(v_i, v_{i+1})$ is a mentioning edge. For this model, the first edge on any leakage path is a sharing edge. In addition, at least one edge on the leakage path is a mentioning edge.

As can be seen, the ISM model can reflect the information propagation on a majority of existing OSNs by selecting the parameters. For example, for Facebook, the function in Custom Privacy to hide certain information from specific users can narrow down the sharing probability to 0 if the source user blocks all his unwanted targets. Thus, when Custom Privacy is in use, the information propagation on Facebook depends on mention probabilities ($p_{uv}$). As another example, for Twitter, information propagations are dependent on both sharing probability and mention probability. That is, $p_{uv}$ can be defined as an alternative sharing-mention probability instead of mention probability for each link (u,v). Accordingly, the ISM model presents the different leaking features in distinct OSNs to enable an understanding as to how information can leak to specific targets.

While it is desirable to avoid sharing information with unwanted targets, the filtering out of friends should be minimized because one of the main purposes of posting a message on OSNs is to share the information with as many friends as possible (i.e. maximize the visibility of the message to friends).

Accordingly, various embodiments of the invention utilize a Maximum Circle of Trust (MCT) optimization to construct a circle of trust (CT) with the maximum number of visible friends for a user so that once the user posts a message visible to this CT, the probability of such friends in this CT spreading the message to unwanted targets is bounded under some input thresholds, where a friend of the user is said to be visible to a message if the message appears on his wall (or new feed or other mechanism used to propagate the information posted on an OSN).

Assuming that information can be spread at most δ hops, the problem can be referred to as a δ-Hop-Propagation Maximum Circle Of Trust (δ-MCT) problem. A "hop" refers to the degree of spread from a first user to another user that is not a direct friend or follower of the first user. For example, a hop of 2 refers to a case where a first user shares a message with his friends (including a second user) and the message is spread from the first user to a third user who is not a direct friend of the first user but who is a friend of the second user. In other words, because the third user is two degrees away from the first user, the message makes 2 hops to reach the third user the first hop being the propagation of the information from the first user to the second user and the second hop being the propagation of the information from the second user to the third user.

In accordance with embodiments of the invention, the δ-MCT problem is defined as follows:

Given a directed graph G=(V,E) with |V| users and |E| edges underlying an OSN, where each edge (u,v) is associated with a tuple of sharing probability and mention probability $\langle a_{uv}, p_{uv} \rangle$. Let T{$t_1, \ldots, t_k$} be the set of k=|T| unwanted targets and s be the source user with |N(s)\T|=$S_n$ neighbors. The δ-MCT problem constructs a circle of trust (CT) with the maximum expected visible friends of s such that the probability of each unwanted target $t_j$ can see the message posted by s after at most δ hops propagation is at most its leakage threshold $\tau_j$, which lies in [0,1).

It is assumed that the source user s is rational. That is, the source user will not directly provide the information to unwanted targets (either by telling the information to that unwanted target or by sharing the information with the unwanted target via an OSN). Accordingly, when source user s is rational, all unwanted targets T must be at least two hops from s.

Since most messages in OSNs are propagated within 2 to 5 hops, information propagation approximations are provided herein for 2-hop information propagation (2-MCT) as well as the case where information can be propagated more than two hops. When the number of unwanted targets is bounded, this variant can be referred to as Bounded-2-MCT.

For the case of a Bounded-2-MCT in which there is only one unwanted target, an FPTAS (full polynomial time approximation scheme) approximation algorithm is provided. For the case of a Bounded-2MCT in which there are multiple unwanted targets, a PTAS (polynomial time approximation scheme) is provided. For the 2-MCT cases where the number of unwanted targets is not bounded, a randomized algorithm is provided with a tight theoretical guarantee. This randomized algorithm can be further derandomized to obtain a deterministic solution.

Because the FPTAS, PTAS, and randomized algorithm are not as suitable for the general case where information can be propagated with more than two hops, further embodiments of the invention provide techniques including a greedy algorithm, in which the running time is tremendously improved (as compared to straight sampling methods) by using a cut-based estimation.

In many OSNs, a majority of messages are limited to being propagated within 2 hops. Part of the reason for leakage of information to be limited to a propagation of 2 hops is the various blocking and privacy functions being made available by the OSNs. In addition, self editing by the user with respect to what information is posted on an OSN results in the number of unwanted targets to be relatively small.

Based on these practical observations, the δ-MCT Problem can be reduced to a Bounded-2-MCT problem in which it is assumed that any message can be spread at most 2 hops and the number of unwanted targets is bounded by some constant κ. According to the Bounded-2-MCT problem, for any user u except the unwanted targets, its propagation can lead to the information leakage if and only if the user receives the message directly from s when δ=2.

FPTAS- and PTAS-based solutions are desirable solutions for a NP-hard problem by enabling a trade-off between accuracy and running time. That is, embodiments using FPTAS and PTAS-based solutions enable a selection of the error parameter based on the allowed time for running the process (e.g., how much time available to wait for a solution before a next action is to be taken). For example, it is possible provide a solution according to desired constraints by allowing more errors when the time is limited and less errors otherwise. FPTAS can be better than PTAS in this respect because FPTAS requires the algorithm to be polynomial in both the problem size and error parameter.

The Bounded-2-MCT problem can be referred to as a Single-2-MCT when there is only a single unwanted target. The NP-hardness of the Single-2-MCT problem is shown in the section entitled "Example: NP-hardness of Single-2-MCT," and the proof showing that the algorithm solving the Single-2-MCT problem in accordance with an embodiment of the invention is actually a full polynomial time approximation scheme (FPTAS) is provided in the section entitled "Example: Proof: Algorithm 1 is FPTAS."

According to an embodiment of the invention, a FPTAS approximation algorithm is provided to create a CT for a user. According to various embodiments of the invention, the FPTAS-based solution is used for solving the Single-2-MCT problem. In one embodiment, the FPTAS-based solution (e.g., Algorithm 1) is used when a source user indicates only one unwanted target.

Because, all unwanted targets T must be at least two hops from a rational source user, it is possible for the Single-2-MCT problem to focus only on the case that the unwanted user t is two hops away from s in G[E\{s,T}] since the unwanted user t cannot see the message if the unwanted user t is at least 3 hops away from s while δ=2. In this case, the probability that the message will be leaked to t is $1-\Pi_{i \in N(s) \setminus \{t\}}(1-a_{si}p_{it})^{x_i}$ because for any user u, except the unwanted targets, the propagation can lead to the information leakage if and only if the user receives the message directly from the source s.

The basic idea of the FPTAS algorithm with k=1 has two main phases:

(1) scaling the sharing probability; and (2) using dynamic programming to find the minimum leakage probability with respect to the scaled sharing probabilities.

First, since all $a_{si}$ are rational values, each can be rewritten with $$\frac{an_{si}}{ad_{si}}$$

where both $an_{si}$ and $ad_{si}$ are integers. Ad is defined to be the least common multiple of all denominators $ad_{si}$. Thus, $$a_{si} = \frac{an_{si}Ad/ad_{si}}{Ad},$$

where the numerator is clearly an integer. Then, in the first phase (scaling the sharing probability), in order to avoid the case that $an_{si}Ad/ad_{si}$ is exponentially larger than $S_n$, the sharing probability $a_{si}$ is scaled for each s's neighbor by the factor $$A = \frac{\varepsilon \max\left\{ \frac{an_{si}Ad}{ad_{si}} \mid a_{si}p_{it} \leq \tau \right\}}{S_n}$$

and its corresponding scaled sharing probability is defined to be $$a'_{si} = \left\lfloor \frac{an_{si}}{A} \right\rfloor.$$

In the second step (dynamic programming), dynamic programming is used to solve a complex problem by breaking the problem down into simpler subproblems in a recursive manner. That is, to solve the MCT problem with respect to the scaled sharing probabilities, the recursion function is defined as follows.

Let $L_i(a)$ be the minimum leakage probability of a subset of s's first i friends with the total circle of trust having size equal to a. Thus, the recursion can be written as $$L_i(a) = \begin{cases} L_{i-1}(a), & \text{if } a < a_i \\ \min\{L_{i-1}(a), L_{i-1}(a-a'_{si}) + w_i\}, & \text{if } a \geq a_i \end{cases} \quad (1)$$

where $w_i = -\log(1 - a_{si} p_{it_j})$ corresponding to the neighbor i of s. The details of the FPTAS Algorithm of an embodiment of the invention are shown in Algorithm 1 (provided in FIG. 14A).

For multiple unwanted targets $k \geq 2$, an FPTAS-based solution is not available. Instead, a PTAS-based solution is provided. A detailed explanation of there being no FPTAS-based solution when $k \geq 2$ is provided in the section entitled "Example: No FPTAS for $k \geq 2$."

Because of the non-existence of FPTAS for the Bounded-2-MCT problem, a PTAS solution, which is the best expected approximation solution, is provided. The PTAS solution is based on an Integer Linear Programming (ILP) formulation that is then relaxed.

According to an embodiment of the invention, the ILP formulation is based on the following: First, an indicator variable $x_i$ is defined for each friend $i \in N(s)$ of s as $x_i = 1$ if i is visible to m, and 0 otherwise. Clearly, the objective is to maximize the circle of trust, i.e., the expected number of visible friends of s. Thus, the formulation can be written as the sum of sharing probabilities of s's friends except unwanted targets, that is, $\max \Sigma_{i \in N(s) \backslash T} a_{si} x_i$.

As previously indicated for the 2-MCT problem, for any user u except the unwanted targets, the user's propagation can lead to the information leakage if and only if the user receives message directly from s when $\delta = 2$. Accordingly, the message will be leaked to $t_j$ if and only if s's neighbor i is informed with probability $a_{si}$ and i further leaks to $t_j$ with probability $p_{it_j}$.

Therefore, the constraint with respect to each unwanted target $t_j$ can be written as $1 - \Pi_{i \in N(s) \backslash T}(1 - a_{si} p_{it_j})^{x_i} \leq \tau_j$. After rearranging and choosing the logarithm of both sides in each constraint and relaxing $x_i \in \{0,1\}$ to $x_i \geq 0$, the following LP is obtained:

$$\max \sum_{i \in N(s) \backslash T} a_{si} x_i \quad (2)$$
$$\text{s.t.} \sum_{i \in N(s) \backslash T} w_{ij} x_i \leq c_j, \forall j \in T$$
$$x_i \geq 0$$

where $w_{ij} = -\log(1 - a_{si} p_{it_j})$ and $c_j = -\log(1 - \tau_j)$.

This LP is referred to as LP(2).

The PTAS algorithm for the Bounded-2-MCT has two phases with respect to a threshold $$\beta = \min\left\{\left\lceil \frac{k}{\varepsilon} \right\rceil - (k-1), |N(s) \backslash T|\right\}$$

with k unwanted targets:

(1) when the number of visible neighbors of s is less than $\beta$, the solution is enumerated and a feasible solution $\pi$ is selected that induces a maximum visibility; and (2) after initializing the current optimal solution as the one in the first phase, each combination of size $\beta$ is checked. For each combination $\Omega$, the LP rounding algorithm (as shown in Algorithm 3) is first used to obtain a bounded solution $\pi_\Omega$ of the subproblem of 2-MCT in terms of the neighbor set $N(s)' = \{i | a_{si} \leq \min i \in \Omega\}$ and $c_j' = c_j - \Sigma_{i \in \Omega} w_{ij}$. Then, the new optimal solution is updated if $\Sigma_{i \in \Omega} a_{si} + \pi_\Omega \leq \pi$. The detail of PTAS algorithm is shown as Algorithm 2 (provided in FIG. 14B).

The subroutine of LP rounding algorithm, as shown in Algorithm 3 (provided in FIG. 14C), starts with a basic solution of LP(2) consisting of k fractional $x_i^{LP}$. Between the sum of $a_{si}$ on integers $x_i^{LP}$ and $a_{sj}$ with the maximum fraction value $x_j^{LP}$, the algorithm returns the larger value as its solution.

Let $\pi^k, \pi^{LP}, \pi^*$ be the solution of Algorithm 3, the optimal LP solution and the optimal solution of 2-MCT. The proof showing that Algorithm 3 is a $1/(k+1)$ approximation algorithm of Bounded-2-MCT is shown in the section entitled "Example: Proof: Algorithm 3 is a $1/(k+1)$ approximation algorithm of Bounded-2-MCT," and the proof showing that the algorithm solving the Bounded-2-MCT problem in accordance with an embodiment of the invention is actually a polynomial time approximation scheme (PTAS) is provided in the section entitled "Example: Proof: Algorithm 2 is PTAS."

In a further embodiment, a randomized algorithm is provided in which randomized rounding is included in LP(2) and then LP(2) is derandomized to obtain a deterministic solution.

For the 2-MCT problem using the randomized algorithm, in addition to LP(2), a definition is provided where $$\hat{c} = \min_j \frac{\log(1 - \tau_j)}{\max_i \log(1 - a_{si} p_{it_j})}.$$

Without loss of generality, it is assumed that $\hat{c} > 1$ since a neighbor i of s cannot be selected in CT if $a_{si} p_{it_j}$ for some unwanted target $t_j$, otherwise this user i will surely leak the information to $t_j$.

In accordance with an embodiment of the invention, after obtaining the solution $x^L$ of the LP (2), each $x^I$ is rounded to 1 with the probability $\mu x^L$ with $\mu = \alpha(\pi^*_{LP}/k)^{1/(\hat{c}-1)}$ where $\alpha < \frac{1}{2}$ and $\pi^*_{LP}$ is the optimal fractional solution of LP(2). This process is illustrated by the scaled randomized rounding of LP(2) shown in Algorithm 4 (provided in FIG. 14D).

A detailed explanation regarding the existence of a solution (obtained by Algorithm 4), which is at least $\beta$ of the optimal solution where $\beta = \mu/2$ as well as an explanation regarding the existence of a polynomial-time deterministic algorithm with expected size of CT at least $$\Omega\left(\left(\frac{OPT}{k}\right)^{\frac{1}{c-1}}\right)$$

are provided in the section entitled "Example: Algorithm 4 Feasibility of Solution." In addition, a detailed explanation for the tightness of the theoretical bound for 2-MCT is provided in the section entitled "Example: Inapproximability Results."

The δ-MCT problem becomes much harder when δ≥3. In fact, as further explained in the section entitled "Example: Proof: δ-MCT problem is #P-hard when δ≥3," the δ-MCT problem is #P-complete when δ≥3, denying the existence of efficient algorithms to solve the problem. Thus, various embodiments of the invention are provided to solve the problem in different settings.

According to one embodiment, an effective algorithm is provided to construct CT. This algorithm is referred to as Iterative Greedy Construction (IGC). IGC is a meta-algorithm, which can be combined with different leakage estimation methods in accordance with various embodiments of the invention.

The IGC algorithm of an embodiment of the invention, as shown in Algorithm 5 (provided in FIG. 14E), iteratively adds one of the source's neighbors into the circle of trust until no more nodes can be added without causing the leakage probabilities to exceed the thresholds. Specifically, in each iteration, the set of candidate neighbors L, those whose addition to CT still guarantees that the leakage levels at each unwanted targets $t_j$ does not exceed the threshold $\tau_j$ is updated. Denote by $l_j(C)$ the probability that the message will be leaked to $t_j$ with respect to CT C. Then, v is a candidate if $l_j(C+\{v\}) \leq \tau_j \forall j=1 \ldots k$.

A greedy function $f(v)$ is used to evaluate the fitness of user v. The function is defined as follows $$f(v) = \frac{a_{sv}}{l_j^{(v)}\left(\sum_{u \in L} l_j^u - l_j^{(v)}\right)} \quad (6)$$
$$\max_{t_j \in T} \frac{}{1 - l_j^{(v)}}$$

where $l_j^{(v)} = l_j(C++\{v\})/\tau_j$ is the normalized leakage level at $t_j$ after adding v to the CT. The numerator of $f(v)$ is selected to be $a_{sv}$ so that the algorithm will favor close friends of s, whose adding increase the visibility.

In addition, the proposed greedy function takes into account the following quantities item $1-l_j^{(v)}$: the remaining leakage tolerance at the unwanted target $t_j$; $\Sigma_{u \in L} l_j^u - l_j^{(v)}$ reflects the future potential leakage to target $t_j$ when adding user v to CT. item By maximizing $f(v)$ the algorithm will prefer user v with small denominator. Thus, the algorithm will select the users that have higher remaining leakage tolerances but lower future potential leakage.

Note that in IGC, it is assumed that there exists a procedure to estimate leakage $\tau_j(C)$, which can be invoked up to $O(S_n^2|T|)$, where $S_n=|N(s)\setminus T|$. Thus, various embodiments of the invention provide particular procedures to estimate the leakage in the IGC.

The estimate leakage component of the IGC decides both the solution quality and the running time of the meta-algorithm. Due to the #P-hardness of the estimating leakage, exact solutions require exponential time. Hence, for realistic time constraints, approximation methods are used to estimate $l_j(C)$.

In one embodiment, the procedure to estimate the leakage $l_j(C)$ in the IGC is Monte Carlo Sampling, in which the accuracy depends on the number of sampling times. For this embodiment, the method stimulates the random process following the ISM propagation model. The information is propagated via each edge (u,v) with sharing probability a(u,v) or mention probability $p_{u,v}$ on G until no newly informed users can be found or the message has been propagated δ hops. The estimation of (C) is calculated as the ratio between the number of time the message reaches $t_j$ via a leakage path to the number of sampling times $n_S$. In the experiments, the sampling times was selected as 20,000; of course embodiments are not limited to the sampling times selected for the experiments.

To speed up the estimation, it is possible to estimate the leakage at all targets at the same time using a single breadth-first search. Then the IGC algorithm, in the worst case, runs in time $O(n_S S_n^2(m+n))$.

According to another embodiment, because sampling methods can be rather expensive for large-scale networks, alternative leakage estimation methods are used to handle the estimate the leakage $l_j(C)$. For example, in one embodiment, a fast method is provided to calculate a non-trivial upper-bounds on the leakage $l_j(C)$ at unwanted target $t_j$. The upper bound is based on identifying minimal pseudo-cutset, as defined later, between the source and the unwanted target. For the explanations that follow, it is assumed that a trusted circle C is already given without further mention; and each edge (u,v) is associated with a combined sharing-mentioning propagation probability q(u,v).

Let t∈T be an arbitrary unwanted target that is to have its leakage level τ(t) estimated, the leakage level being defined as the probability of having a path between s and t. For each edge (u,v), define event $X_{u,v}=1$ if the information can propagate through the edge (u,v) and $X_{u,v}=0$ otherwise i.e., $Pr[X_{u,v}=1]=q(u,v)$. A cutset ⟨S, T⟩ is defined as ⟨S, T⟩ ={(u,v)∈E|u∈S, v∈T}. For a subset of edges A⊆E, let A* be the event that all the edges of A do not let the information propagate through i.e., $Pr[A^*]=\Pi_{e \in A}(1-q)$. Then, the exact leakage τ(t) can be computed as follow $$1 - Pr\left[\bigcup_{\langle S,T \rangle \in C_{s,t}} C^*\right],$$

where $C_{s,t}$ is the set of all cutsets ⟨S, T⟩ satisfied s∈S and t∈T. However, computing this exact formulation is intractable. Accordingly, first, the formulation is relaxed by replacing $C_{s,t}$ with a collection of cutsets $B \subset C_{s,t}$. This yields the following upper-bound on the leakage τ(t)

$$1 - Pr\left[\bigcup_{\langle S,T \rangle \in B} C^*\right] \geq \tau(t)$$

Note that when B contains only disjoint cutsets, the upper bound can be efficiently computed in polynomial time. Thus, in the non-sampling estimation method of this embodiment of the invention, a maximal collection of disjoint cutsets is sought. The selection of good disjoint cutsets that gives close estimation is governed by two factors. First, small cutsets are preferred; at the same time, a collection of many cutsets is preferred. Note that the number of cutsets is bounded by the distance between the source and the unwanted target. Since if P is an s,t path of minimum length l, every cutset must contains at least one edge in P. Thus, the maximum number of disjoint cutsets that separate s and t cuts equals the minimum length of a path between s and t.

In accordance with an embodiment of the invention, instead of using cutsets, pseudo-cutsets are used. Pseudo-cutsets are the set of edges whose removal makes the distance from the source s to destination t at least δ+1 hops. The reason is that disrupting all paths of length at most δ is sufficient to prohibit the message to propagate to t. The algorithm to find the pseudo-cutsets and compute the upper-bound is given in Algorithm 6 (shown in FIG. 14F).

The algorithm first applies a Breadth-First Search algorithm to construct layers of vertices. Layer $L_i$ consists of vertices at distance i from the source in term of hops. The cutset C is constructed by including all edges (u,v) with u∈$L_i$ and v∈$L_{i+1}$ but only if $d_s(u)+d_t(v) \leq \delta-1$ (i.e., there is a path of length at most δ going through the edge (u,v)). The upper-bound can be computed efficiently, since it only requires visiting nodes within δ-hop from the source instead of doing so $n_S$ times as in the sampling method.

Although the Disjoint Cutset Upper-bound may not be as accurate as other presented methods, it is a scalable method to estimate the leakage. Moreover, it is also rather effective in comparing the neighbors to find out the ones causing the leaks to the unwanted targets. The use of the disjoint cutset upper-bound to estimate the leakage in the IGC algorithm can be referred to as the Non-sampling Method.

Since the Non-sampling method can overestimate the leakage at the unwanted targets, the Non-sampling Method often stops early even there are neighbors that can still be added to CT. Thus, in a further embodiment, the Non-sampling method for the IGC algorithm using the upper-bound via disjoint cutsets can be further fine tuned.

According to one such further embodiment, a hybrid method is provided that combines the (Monte-Carlo) Sampling method and the Non-sampling method. In a specific embodiment, the hybrid method involves two phases. In the first phase, the Non-sampling method is used to quickly construct a CT. In the second phase, a simple heuristics method is used together with the Monte-Carlo sampling algorithm to add more neighbors to the circle as follows:

1. Sort the neighbors that are not included in the circle in non-decreasing order of their visibilities;
2. In that order, include each neighbor into CT and check if the leakage below the thresholds using Sampling algorithm. If so, add the node to CT.

The hybrid method of this embodiment of the invention achieves both the speed of the Non-sampling method and the high solution quality of the Sampling method. Since, the hybrid method can involve at most $S_n$ calls to the sampling estimation algorithm, the running time of the hybrid method is very competitive for large networks. As illustrated in the example experiments, often only one to three neighbors are added using the hybrid method's heuristic. Thus, the first phase using the Non-sampling method can be rather effective in terms of detecting trusted friends.

Figure 2:
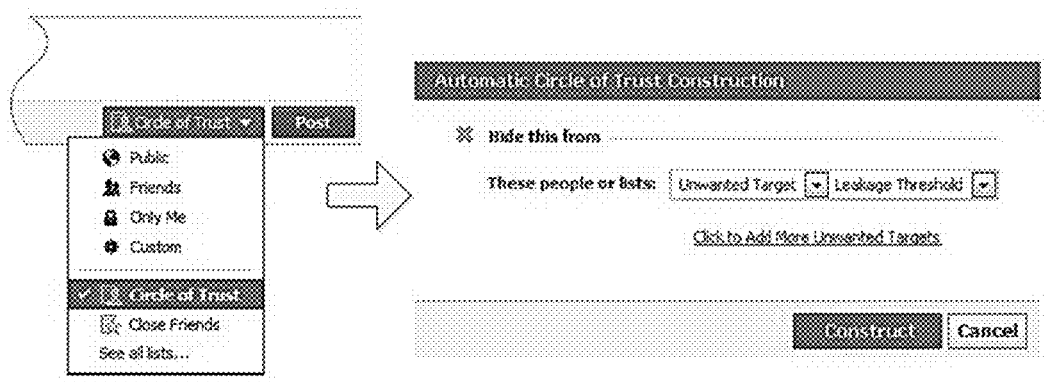
FIG. 2 illustrates an example screen shot of a user interface when constructing a circle of trust in accordance with an embodiment of the invention.

Returning to Bob's problem with respect to avoiding the stories and pictures from reaching Chuck, in one solution Bob is provided with an opportunity to construct on-the-fly a subset of his friends to share these stories with so that the probability of Chuck knowing them is very small. This subset of friends can be referred to as a "circle of trust" (CT). FIG. 2 illustrates an example screen shot for the automatic construction of the circle of trust in accordance with an embodiment of the invention. In a further embodiment, the construct-on-the-fly subset can be created right before Bob is ready to share his stories.

Figure 3:
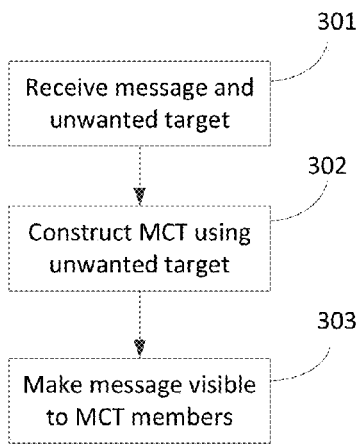
FIG. 3 shows a block diagram of a method of constructing a circle of trust in accordance with an embodiment of the invention.

FIG. 3 shows a block diagram of a method of constructing a circle of trust in accordance with an embodiment of the invention. First, the system can receive a message and at least one unwanted target for the message from a source user of the OSN 301. Then, using the information regarding the current listing of friends (or followers) and the unwanted target(s), a maximum circle of trust (MCT) is constructed 302. When the user makes the selection to post the message, the system can automatically select who of the user's friends or followers that the message will be made visible based on those that are in the MCT 303. The method can be carried out in a computing environment using a computing system. The computer system can have hardware including one or more computer processing units (CPUs), memory, mass storage (e.g., hard drive), and I/O devices (e.g., network interface, user input devices). Elements of the computer system hardware can communicate with each other via a bus.

The construction of the MCT can be accomplished using any of the methods described herein. The mathematical relationships and equations provided herein can be carried out by a processor executing instructions stored on a computer-readable medium. In a further embodiment, the algorithm used for constructing the MCT can be selected on-the-fly according to the number of unwanted targets. For example, both the FPTAS algorithm, Algorithm 1, and one of the PTAS algorithms or the IGC (with selected leakage estimating procedure) can be used depending on the user's input regarding the unwanted targets.

Certain techniques set forth herein may be described in the general context of computer-executable instructions, such as program modules, executed by one or more computers or other devices. Certain embodiments of the invention contemplate the use of a computer system or virtual machine within which a set of instructions, when executed, can cause the system to perform any one or more of the methodologies discussed above. Generally, program modules include routines, programs, objects, components, and data structures that perform particular tasks or implement particular abstract data types.

It should be appreciated by those skilled in the art that computer-readable media include removable and non-removable structures/devices that can be used for storage of information, such as computer-readable instructions, data structures, program modules, and other data used by a computing system/environment. A computer-readable medium includes, but is not limited to, volatile memory such as random access memories (RAM, DRAM, SRAM); and non-volatile memory such as flash memory, various read-only-memories (ROM, PROM, EPROM, EEPROM), magnetic and ferromagnetic/ferroelectric memories (MRAM, FeRAM), and magnetic and optical storage devices (hard drives, magnetic tape, CDs, DVDs); or other media now known or later developed that is capable of storing computer-readable information/data. Computer-readable media should not be construed or interpreted to include any propagating signals.

A greater understanding of the present invention and of its many advantages may be had from the following experimental study and examples addressing the δ-MCT problem for constructing a maximum circle of trust, given by way of illustration. The following examples are illustrative of some of the methods, applications, embodiments and variants of the present invention. They are, of course, not to be considered in any way limitative of the invention. Numerous changes and modifications can be made with respect to the invention.

Example 1

Experimental Study

Experiments were performed on a collection of large OSNs to measure the efficiency of the various algorithms described herein in accordance with certain embodiments of the invention and apply those algorithms to provide better insights into the information leakage process in social networks.

Experiments were performed on three real-world OSNs, including Facebook, Twitter and Foursquare. The statistics of the used networks can be found in Table 1. The Facebook dataset is obtained from Viswanath et al. "On the Evolution of User Interaction in Facebook," Proceedings of WOSN'09, August 2009. The Twitter dataset is extracted from the Twitter network provided by Cha et al. "Measuring User Influence in Twitter: The million Follower Fallacy," Proceedings of the 4$^{th}$ International AAAI Conference on Weblogs and Social Media (ICWSM), May 2010, by applying the unbiased sampling method in Gjoka et al. "Walking in Facebook: A case study of unbiased sampling of OSNs," Proceedings of IEEE INFOCOM 2010, pages 1-9, IEEE, March 2010. Foursquare dataset was obtained by crawling, in which a set entrepreneurs and investors was selected as the seeding, and then the Foursquare API was used to get the users and their connections within two hop from the seeds.

TABLE 1

Dataset

| Dataset | Nodes | Edges | Density |
|---|---|---|---|
| Facebook | 63,731 | 905,565 | 4.46% |
| Twitter | 88,484 | 2,364,322 | 3.02% |
| Foursquare | 44,832 | 1,664,402 | 8.28% |

[*] Facebook are undirected networks; Twitter and Foursquare are directed networks.

Due to the lack of ground truth, uniform random numbers between 0 and 1 were independently assigned to sharing probability $a_{uv}$ and mention probability $p_{uv}$ of each edge. Unless otherwise mentioned, the source was randomly selected, and the unwanted targets were picked up randomly among the nodes that are within $\delta$ hops from the source.

The following algorithms in accordance with embodiments of the invention were implemented and compared:
1. Sampling: IGC algorithm using Monte-Carlo Sampling;
2. Non-Sampling: IGC algorithm using Disjoint Cut-sets (using Algorithm 6);
3. Hybrid: IGC-Hybrid algorithm;
4. Removal-Greedy, in which users are removed one by one to construct the CT. Here, the performance differences between adding a user one by one to the CT (such as in IGC Algorithm) and removing a user one by one from the list of s's friends in order to obtain the CT is compared. The Removal-Greedy algorithm is a simple approach in which a user v is removed if the greedy function $f(v)$ is maximized:

$$\frac{\sum_{t_j \in T, \tau_j(C) > \tau_j} |\tau_j(C) - \tau_j|}{a_{sv} + \sum_{i \in C_v} a_{si}} - \frac{\sum_{t_j \in T, \tau_j(C_v) > \tau_j} |\tau_j(C_v) - \tau_j|}{\sum_{i \in C_v} a_{si}}$$

where $\tau_j(C)$ is the expected probability that unwanted target $t_j$ knows the information when s only chooses the subset C to share, and $C_v = C \setminus \{v\}$. The Removal-Greedy can be summarized as shown in FIG. 14G (Algorithm 7: Removal Greedy Algorithm).

5. Randomized-Rounding: The approximation randomized algorithm, Algorithm 4, which is run 20 times to provide the average results;
6. Optimal: The optimal solution found by solving the Integer Programming of the LP (2) using the CPLEX method.

In the sampling subroutine for implementations 1 and 3, the random process was simulated 20,000 times. The optimal solutions and the fractional LP solutions in the randomized algorithm are obtained by using CPLEX optimization package. All algorithms are performed on a cluster of 20 PCs with CPU AMD Opteron 2.00 Ghz and 32 GB RAM.

The following quantities were measured:
(1) Visibility (%): The fraction of expected visible neighbors of the source s defined as $$\frac{\sum_{j \in CT} a_{sj}}{\sum_{j \in N(s) \setminus T} a_{sj}}.$$

(2) CT Size (%): The fraction of visible friends in CT, defined as $$\frac{|CT|}{|N(s) \setminus T|}.$$

Often, the larger visibility, the bigger CT size, however, it is a more intuitive metric than visibility in many cases.

(3) Running Time: The running time in seconds. item

The visibility (%) and running time were measured when the leakage threshold ranges from 0.05 to 0.4. For each leakage threshold, 100 sets of random sources and five unwanted targets were randomly choses and the results were averaged.

Figure 4A:
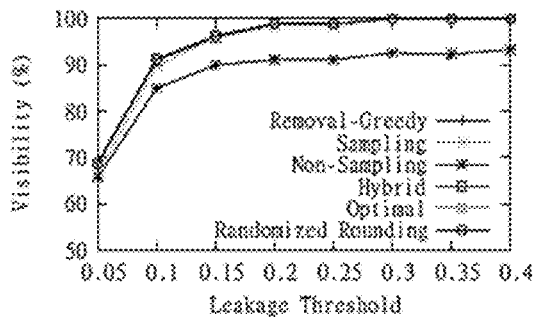
FIGS. 4A and 4B show the visibility and time results, respectively, of the six embodiments implemented on the Foursquare dataset where $\delta=2$.
Figure 4B:
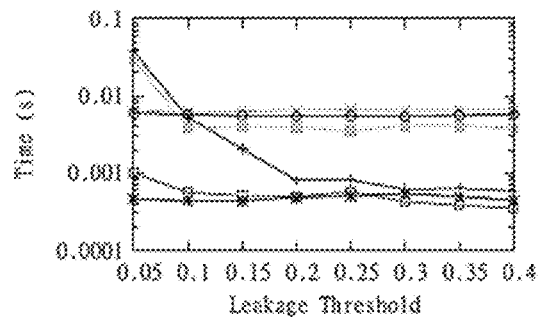
Figure 4C:
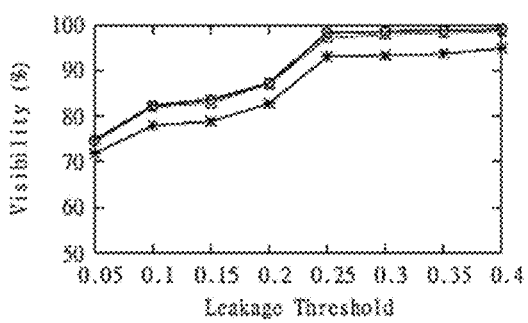
FIGS. 4C and 4D show the visibility and time results, respectively, of the six embodiments implemented on the Facebook dataset where $\delta=2$.
Figure 4D:
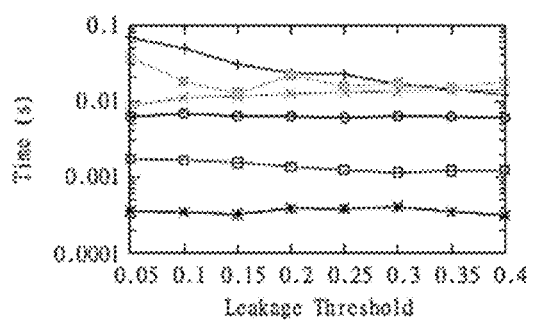
Figure 4E:
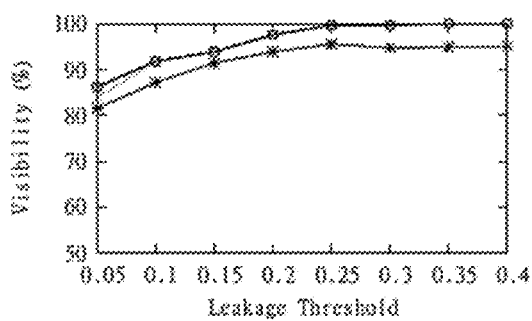
FIGS. 4E and 4F show the visibility and time results, respectively, of the six embodiments implemented on the Twitter dataset where $\delta=2$.
Figure 4F:
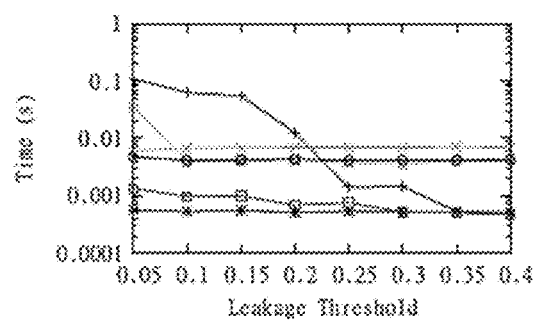
Figure 5A:
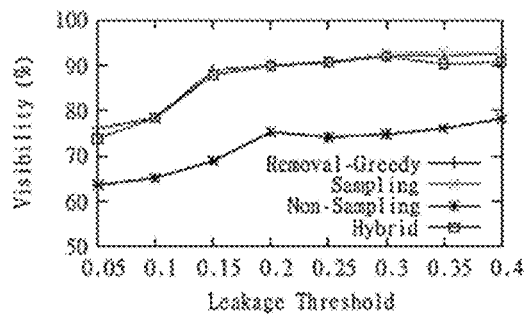
FIGS. 5A and 5B show the visibility and time results, respectively, of the six embodiments implemented on the Foursquare dataset where $\delta=3$.
Figure 5B:
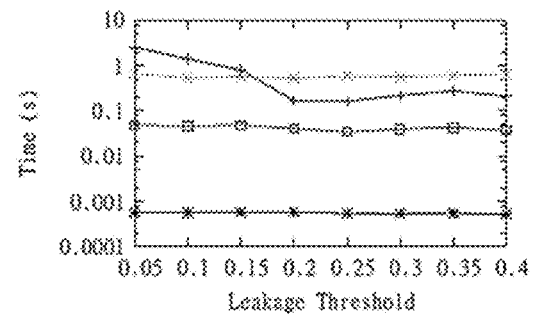
Figure 5C:
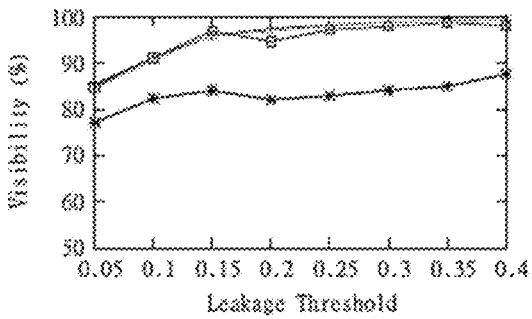
FIGS. 5C and 5D show the visibility and time results, respectively, of the six embodiments implemented on the Facebook dataset where $\delta=3$.
Figure 5D:
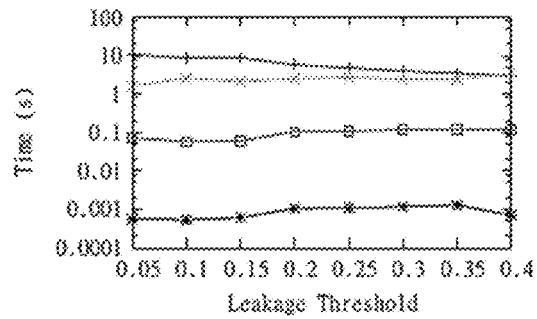

As shown in FIGS. 4A, 4C, and 4E, the algorithms Removal-Greedy, Sampling, Hybrid, and Randomized Rounding produce optimal or close-to-optimal results in term of visibility. The hybrid algorithm performs slightly worse than the others, however, the gap is usually negligibly small. As expected, non-sampling method shows the worst results among all. The Visibility obtained with Non-sampling methods are 5% to 10% smaller than the others. The reason is that when the Non-sampling method examines if any nodes can be added to the CT, it is often pessimistic about the current leakage situation and stop early. Clearly, the non-sampling method is not optimal as a standalone method to construct CT, but rather as a method to construct an early version of CT. Similar observations for $\delta=3$ can be seen in FIGS. 5A, 5C, and 5E.

Moderately surprising, not too many friends need to be blocked to inhibit information leakage. Even when the leakage threshold is 5%, the visibility still ranges from 70% to 90%. In addition, the visibility increases quickly when the threshold increases.

As illustrated in FIGS. 4A, 4C, 4E and 5A, 5C, and 5E, when comparing the cases $\delta=2$ and $\delta=3$, the visibility in Foursquare decreases, while those in Facebook and Twitter show the reverse trend. Moreover, in case $\delta=3$ the visibility in Foursquare does not approach 100% when the leakage threshold increases. The main reason for smaller visibility in Foursquare is the closer distance between sources and targets in Foursquare. This is an artifact caused by the way we crawled the Foursquare network. As we only query the users within two-hops from the seeding in Foursquare, the randomly generated targets in Foursquare are often 2-hops away from the source, regardless of $\delta$. In contrast, there is a high probability that the distance in hop from the source and the target in Facebook and Twitter equal exactly the value of $\delta$. This observation, more or less, supports the hypothesis that the closer the source and the unwanted target, the smaller the CT.

The running time of the studied algorithms are shown in FIGS. 4B, 4D, and 4F and 5B, 5D, and 5F. From the plots, it can be seen that all methods appear adequately fast when $\delta=2$. When $\delta=3$, the Non-sampling and Hybrid method are substantially faster than the other methods. Because the Hybrid avoids most of the calls to the sampling at the early selection steps; it can be up to a hundred times faster than the Removal-Greedy and the Sampling methods.

In comparison to the Sampling method, the running time of Removal-Greedy is excessively high for small leakage threshold, when the algorithm takes many rounds to remove nodes until obtaining the CT. In contrast, Sampling method (as well as Hybrid and Non-sampling method) has the running time slightly increased when the leakage threshold increases, which leads to larger CTs. Since it is often desirable to have a smaller leakage threshold, in practice, the algorithms that construct CT by adding nodes may have higher performance than those that find the CT in a removing nodes fashion.

Clearly, for $\delta=2$ the optimal solution by solving LP(2) is the best selection. When $\delta \geq 3$, the Hybrid is the method of choice due to both its outstanding solution quality and fast running time, less than 0.1 second. Note that the ability to construct CT quickly is critical, if one wishes to implement the algorithm on social network platforms. For larger networks and $\delta$, the only applicable method is, however, the Non-sampling method.

Example 2

Case Study can Celebrities Keep their Secrets?

Several observations were obtained by solving LP(2) ($\delta=2$) and using the Hybrid method ($\delta=3$) that give the best performance in general.

Figure 6C:
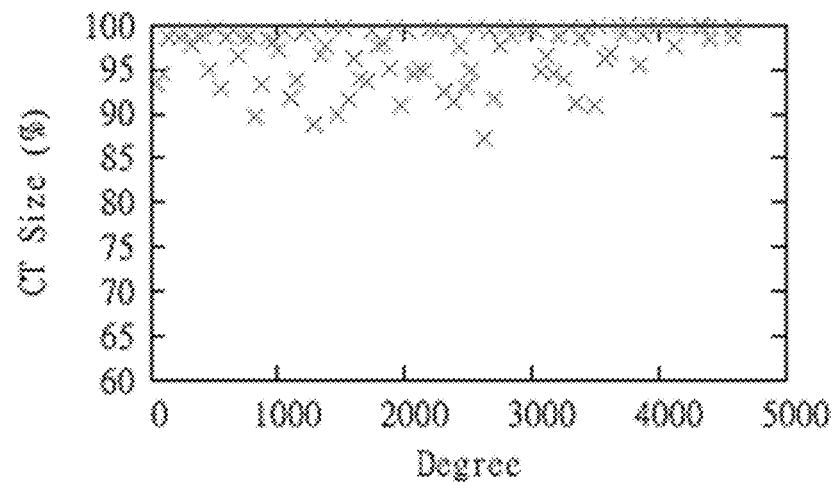

The question as to whether or not "celebrities", users with a large number of friends or followers, can only share their information with a small number of their friends to avoid information leakage was investigated. This was carried out by focusing on the relation between the degree of the source and their CT sizes. Intuitively, when a user has more friends, there is a high chance one or more of his friends will forward the information further. Thus, to avoid information leakage, it would be expected that the CT of "celebrities" would include only a small fraction of their friends. To verify the hypothesis, source users were selected with different degrees, increasing by 1% of the maximum degree in each step. For each source, ten random sets of five unwanted targets where selected and the average size of CT was computed by solving the LP(2). The results are shown in FIGS. 6A-6C. From the plots, it can be seen that the expectation that the celebrity would have a smaller fraction of friends in their CT was wrong.

In contrast to the hypothesis, there is no sharp decrease in the CT size. Indeed, for the source with the highest degree, the CTs contain more than 95% of the neighbors. This suggests that by carefully constructing CT, smartly sharing information to avoid leakage is possible for "celebrities".

Example 3

Case Study can we Trust Our Popular Friends?

There is an incentive not to share our sensitive information to a popular person (celebrity) who could easily leak the information further. In other words, the friends of a celebrity may be less likely to trust that person. To investigate the effect of the "celebrity level," 10 users with different degree were selected in each network, incrementing by 10% of the maximum degree. For each "celebrity," each of his neighbors were selected to be the source and the percentage that the "celebrity" was included in his friends' CTs was computed.

Figure 7:
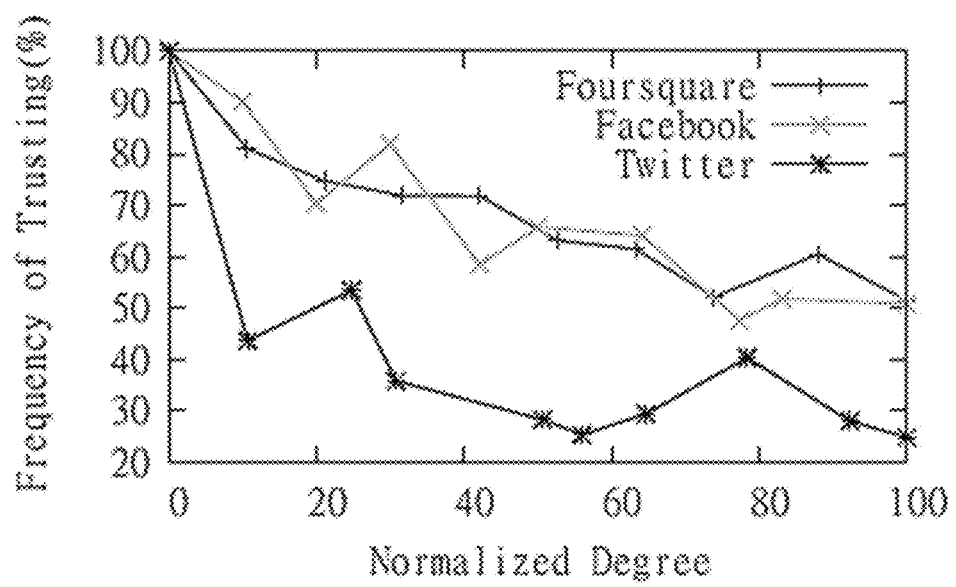
FIG. 7 shows a plot indicating the "trust level" of a friend for a user according to the degree of the user (when the user becomes more popular).

As illustrated in the FIG. 7, the "trust level" of the friends for a user decreases quickly when the degree of the user increases, i.e. when the user becomes more popular. However, even for the user with the highest degree, half of his friends still can trust him as in the cases of Facebook and Foursquare. For Twitter, only 20% of the friends can trust the considered user. This can be explained by the fact that Twitter is a directed network with low reciprocity (A follows B, but B does not follow A). Thus, the celebrities are often not even considered to be friends to be included in the CTs. Roughly speaking, "celebrities" in social networks such as Facebook are relatively "trusted," while the same conclusion does not hold for the "social media" network Twitter.

Example 4

Case Study Unwanted Friend of Friends

Another interesting question is the impact of the relation between source user and the unwanted targets to the CT and whether it is necessary to block all the common neighbors. It can be observed in the Foursquare network $\delta=3$ that the closer the distance between sources and unwanted targets, the smaller the CT. The relation between the number of common friends and the CT size was studied.

Figure 8A:
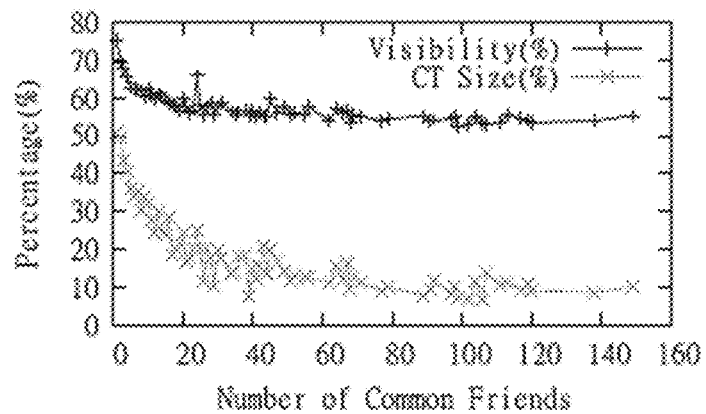
FIGS. 8A-8C show he impact of common friends between sources and targets for the Foursquare dataset (FIG. 8A), the Facebook dataset (FIG. 8B) and the Twitter dataset (FIG. 8C).
Figure 8B:
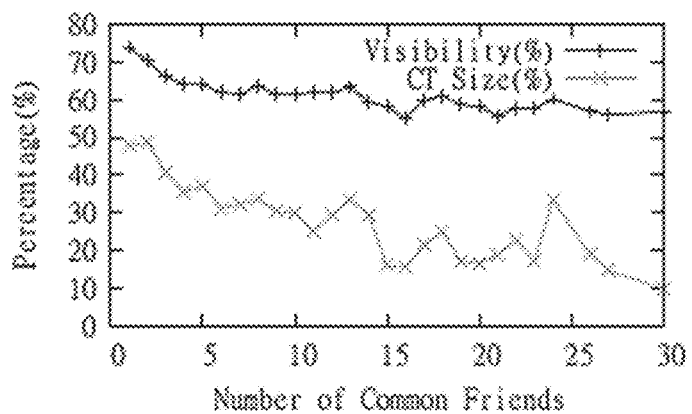
Figure 8C:
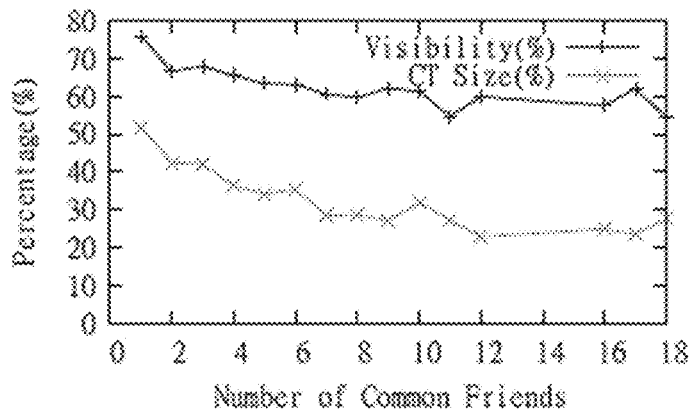

FIGS. 8A-8C show plots of the average Visibility and CT Size with respect to the number of common friends. As can be seen, the CT Size decreases sharply from 50% to 10% with the increase of the number of common friends. However, the visibility reduces at a much lower rate. Regardless of the number of common neighbors, the visibility is still nearly 60%.

Therefore, the case when the unwanted targets are close to the source, is not as bad as it appears. The growing gap between the Visibility and CT size reflects that it is still possible to effectively select high visibility neighbors into the CT despite the shrinking of the CT.

Example

NP-Hardness of Single-2-MCT

Theorem 1: Single-2-MCT is NP-complete.
Proof.

Figure 9:
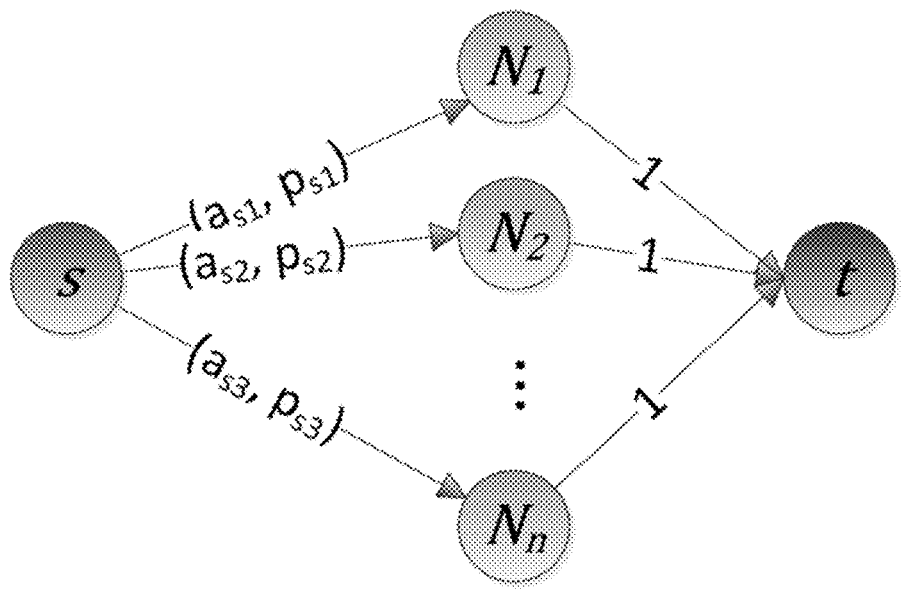
FIG. 9 illustrates a Single-2-MCT Reduction.

In the proof, it is easy to see that the decision version of Single-2-MCT$\in$NP. To prove that Single-2-MCT is NP-hard, the known NP-hard subset sum problem is reduced to the Single-2-MCT. The known NP-hard subset sum problem asks if there exists a non-empty subset whose sum is Z given a set of integers $(z_1, z_2, \ldots, z_n)$ and an integer Z. Let I be an arbitrary instance of subset sum problem, the construction is as illustrated in FIG. 9. As shown in FIG. 9, two terminal nodes s, t and n nodes $N_i$, i=1 . . . n are constuced for each item in I. For each node $N_i$, an edge from s to the node $N_i$ is constructed with a sharing probability $$a_{si} = \frac{z_i}{\sum_i z_i}$$

and mention probability $$p_{si} = 1 - e^{-\frac{z_i}{\Sigma_i z_i}};$$

and another edge from $N_i$ to t is constructed with mention probability $p_{it}=1$. The leakage threshold $\tau$ is set as $$\tau = 1 - e^{-\frac{z}{\Sigma_i z_i}}$$

for the target t. It is shown that there is a subset sum of I if and only if the reduced instance has a Single-2-MCT with the expected visible users at least $$\frac{Z}{\sum_i z_i}.$$

First, suppose that R is a yes instance of I. Now consider a set R'={$N_i$|i∈R}. If s posts his message to R', then the leakage probability to t is exactly $1-\Pi_{i \in R} a_{si} p_{it} = \tau$ and the size of CT is $$\sum_{i \in R} \frac{z_i}{\sum_i z_i} = \frac{Z}{\sum_i z_i},$$

implying R' is a yes instance of Single-2-MCT.

Conversely, suppose that R' is a Single-2-MCT instance in G with respect to s and t with the leakage probability $\tau = 1 - \Pi_{i \in R} a_{si} p_{it}$, that is, $$\sum_{i \in R'} \frac{z_i}{\sum_i z_i} \le \frac{Z}{\sum_i z_i}.$$

Then R={i|$N_i$∈R'} is a subset sum of I. This is because the expected visible friends of R' is at least $$\sum_{i \in R'} \frac{z_i}{\sum_i z_i} \ge \frac{Z}{\sum_i z_i}.$$

Thus, $$\sum_{i \in R} \frac{z_i}{\sum_i z_i} = \frac{Z}{\sum_i z_i}.$$

Example

Proof: Algorithm 1 is FPTAS

To show that Algorithm 1 is FPTAS, first it is shown that the approximation ratio $(1-\epsilon)$ and the time complexity is polynomial in both the input size and error parameter for the Single-2-MCT.

Proof.

Let C* be the optimal set of CT, $\pi_i^\epsilon$ be the expected size of CT C obtained by Algorithm 1, and $\pi^*$ be the optimal solution of Single-2-MCT. Then, $$\pi_1^\epsilon = \sum_{i \in C} a_{si} \ge \frac{1}{Ad} \sum_{i \in C} A \left\lfloor \frac{a_{si}Ad}{A} \right\rfloor \ge$$

$$\frac{1}{Ad} \sum_{i \in C^*} A \left\lfloor \frac{a_{si}Ad}{A} \right\rfloor \ge \frac{1}{Ad} \sum_{i \in C^*} A \left( \frac{a_{si}Ad}{A} - 1 \right) =$$

$$\sum_{i \in C^*} \left( a_{si} - \frac{A}{Ad} \right) \ge \pi^* - \epsilon \frac{|C^*|\max\{a_{si} \mid a_{si}p_{it} \le \tau\}}{S_n} \ge (1-\epsilon)\pi^*$$

where the last step holds since $\max\{a_{si}|a_{si}p_{it} \le \tau\} \le \pi^*$ and $|C^*| \le S_n$.

Next it is shown that Algorithm 1 has the running time of $O(S_n^3/\epsilon)$.

Proof.

The running time of Algorithm 1 is dependent on the second phase of dynamic programming, which has its running time $O(S_n A_u)$. That is, $$S_n A_u \le S_n \cdot S_n \frac{an_{si}}{A} \le S_n^2 \frac{S_n}{\epsilon} = \frac{S_n^3}{\epsilon}$$

Thus, Algorithm 1 is FPTAS.

Example

No FPTAS for k≥2

There is no FPTAS for 2-MCT problem with any k≥2 unless P=NP.

Proof.

The 2-MCT problem is reduced from EQUIPARTITION problem, which asks if there exists a subset of items R satisfying both |R|=n/2 and $\Sigma_{j \in R} \overline{\omega}_j = \Sigma_{j \notin R} \overline{\omega}_j$, given n items with integer weight $\overline{\omega}_j$ for j=1, . . . , n and even n.

The EQUIPARTITION problem has been proven to be NP-hard by M. Gjoka, M. Kurant, C. T. Butts, and A. Markopoulou, "Walking in Facebook: A case study of unbiased sampling of OSNs," in Proceedings of IEEE INFOCOM 2010, pages 1-9, IEEE, March 2010.

Accordingly, let a set of even number of n items with each integer weight $\overline{\omega}_j$ be an arbitrary instance I of EQUIPARTITION. An instance of 2-MCT must be constructed, in polynomial time, such that if there exists a FPTAS to solve the 2-MCT on this instance, this algorithm can be applied to solve the EQUIPARTITION problem on I in polynomial time.

Figure 10:
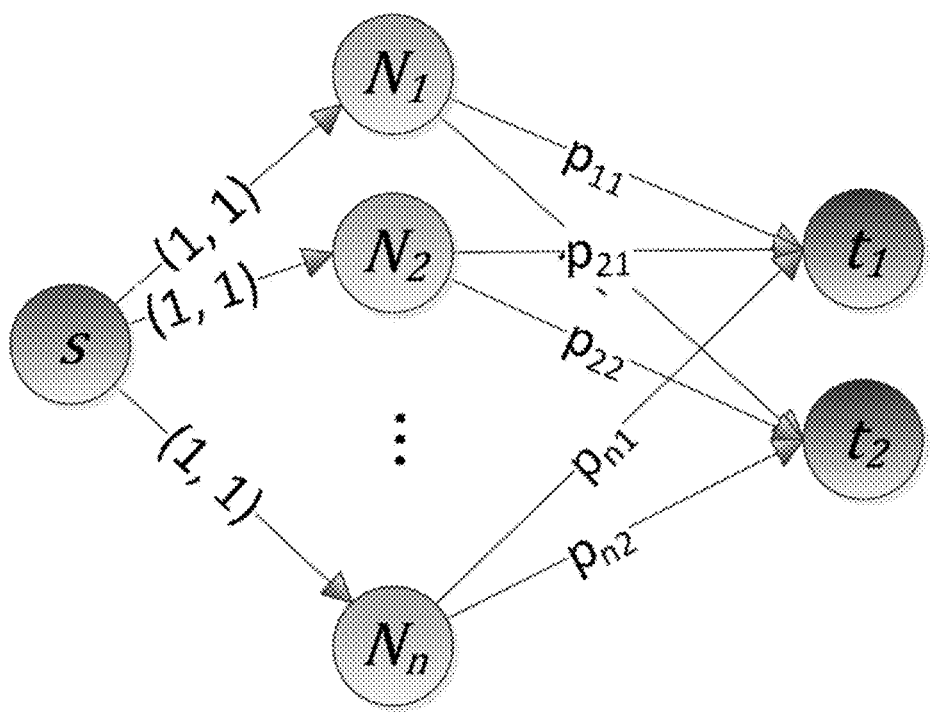
FIG. 10 illustrates 2-MCT Reduction G from EQUIPARTITION (All edges from s to nodes (N) have probability 1; an edge from $N_i$ to $t_1$ and $t_2$ has probability $$p_{i1} = 1 - e^{-\frac{\overline{w}_i}{\Sigma_i \overline{w}_i}} \text{ and } p_{i2} = 1 - e^{-\frac{\overline{w}_{max} - \overline{w}_i}{n\overline{w}_{max} - \Sigma_i \overline{w}_i}}).$$

The construction, also shown in FIG. 10, is as follows. Given n items, n+3 nodes are constructed for graph G: node $u_i$ for each item; a source node s and 2 unwanted targets $t_1$ and $t_2$. The mention probability from s to each $u_i$ is 1. For each $u_i$, the mention probability from him to $t_1$ and $t_2$ are $$p_{i1} = 1 - e^{-\frac{\overline{\omega}_i}{\Sigma_i \overline{\omega}_i}} \text{ and } p_{i2} = 1 - e^{-\frac{\overline{\omega}_{max}-\overline{\omega}_i}{n\overline{\omega}_{max}-\Sigma_i\overline{\omega}_i}}$$

respectively. Moreover, $\tau_1$, $\tau_2$ are set to be $1-e^{-1/2}$ and all sharing probabilities are set as $a_{sN(S)}=1$. It is first shown that there is an EQUIPARTITION of I if and only if the reduced instance has 2-MCT of size at least n/2.

First, suppose that R is a yes instance of I. Clearly, $|R|=n/2$ and $\Sigma_{j\in R}\overline{\omega}_j = \Sigma_{j\notin R}\overline{\omega}_j$. Now consider a set $R'=\{N_i|i\in R\}$. If s posts his message to R', then the leakage probability to $t_1$ and $t_2$ are $$1-\prod_{i\in R}(1-p_{i1}) = 1-\prod_{i\in R}e^{-\frac{\overline{\omega}_i}{\Sigma_i\overline{\omega}_i}} = 1-e^{-1/2}$$

and $$1-\prod_{i\in R}(1-p_{i2}) = 1-\prod_{i\in R}e^{-\frac{\overline{\omega}_{max}-\overline{\omega}_i}{n\overline{\omega}_{max}-\Sigma_i\overline{\omega}_i}} = 1-e^{-1/2}$$

which are no larger than $\tau_{r1}$ and $\tau_{r2}$. And the circle of trust has its size n/2, implying R' is a yes instance of 2-MCT.

Conversely, suppose that R' is a 2-MCT instance in G with respect to s and t. By satisfying $$1-\prod_{i\in R'}e^{-\frac{\overline{\omega}_i}{\Sigma_i\overline{\omega}_i}} \leq 1-e^{-1/2}$$

and $$1-\prod_{i\in R'}e^{-\frac{\overline{\omega}_{max}-\overline{\omega}_i}{n\overline{\omega}_{max}-\Sigma_i\overline{\omega}_i}} \leq 1-e^{-1/2}$$

it is immediately provided that $\Sigma_{i\in R}\overline{\omega}_i \leq \frac{1}{2}\Sigma_{i\in N(s)}\overline{\omega}_i$ and $\Sigma_{i\in R}(\overline{\omega}_{max}-\overline{\omega}_i) \leq \frac{1}{2}(n\overline{\omega}_{max}-\Sigma_{i\in N(s)}\overline{\omega}_i)$. After summing these two inequalities up, $|R'|\leq n/2$ is obtained. Since the size of CT is at least n/2, i.e., $|R'|\geq n/2$, $|R'|=n/2$ is obtained. Then, substituting $|R'|=n/2$ into the second above inequality, it is provided that $\Sigma_{i\in R}\overline{\omega}_i \geq \frac{1}{2}\Sigma_{i\in N(s)}\overline{\omega}_i$. Combining with the first inequality, $\Sigma_{i\in R}\overline{\omega}_i = \frac{1}{2}\Sigma_{i\in N(s)}\overline{\omega}_i$. Thus, $R=\{i|N_i\in R'\}$ is a EQUIPARTITION of I.

Then, suppose that there is an FPTAS for 2-MCT, it is now attempted to be shown that this polynomial time algorithm can be applied to solve the NP-complete EQUIPARTITION problem, which leads to the contradiction. Let A be an FPTAS algorithm generating an $(1-\epsilon)$-approximation algorithm for 2-MCT for any $\epsilon>0$ in polynomial time with respect to both n and $1/\epsilon$. When choosing $$\varepsilon = \frac{1}{n+1},$$

the following relations between the solution of $\pi^A$ and optimal solution $\pi^*$ are given as $$\pi^A \geq (1-\epsilon)\pi^* > \pi^* - \pi^*/n \geq \pi^* - 1$$

where the last step follows from a trivial observation that $\pi^*\leq n$. Due to the equivalence between EQUIPARTITION and 2-MCT in the above reduction, a solution $\pi^A > \pi^* - 1$ for EQUIPARTITION can be obtained. However, the integrality of the solution to EQUIPARTITION implies that $\pi^* = \lceil\pi^A\rceil$, which means that A can solve the EQUIPARTITION problem in polynomial time. This contradicts the fact that EQUIPARTITION is NP-hard.

Example

Proof: Algorithm 3 is a 1/(k+1) Approximation Algorithm of Bounded-2-MCT

Algorithm 3 is a $$\frac{1}{k+1}$$

approximation algorithm of Bounded-2-MCT.

Proof.

According to D. G. Luenberger, "Linear and Nonlinear Programming, Second Edition, Springer, September 2003, each LP formulation with n variables and d constraints has a basic optimal solution with at most min{d, n} fractional values. It is possible to obtain such a basic optimal solution x* in the first step. Then $$\pi^* \leq \pi^{LP} \leq \sum_{i\in I}a_i + kF_{max} \leq (k+1)\pi^k$$

where the last step follows from Algorithm 3.

Example

Proof: Algorithm 2 is PTAS

To show that Algorithm 2 is PTAS, first it is shown that the approximation ratio $(1-\epsilon)$ and the time complexity is polynomial in the input size.

Proof:

If $\pi^*$ has less than $\beta$ items, it is possible to obtain the optimal solution in the first phase by enumerating all possible combinations. This certainly leads to the optimal solution. When $\pi^*>\beta$, let $Q^*$ be the $\beta$ items having the maximum circle of trust in the optimal solution and consider two cases as follows:

$$\text{Case 1: } \sum_{i\in\Omega}*a_i \geq \frac{\beta}{\beta+k+1}\pi^*$$

From the last step and the condition of this case:

$$\pi^\varepsilon \geq \sum_{i\in\Omega^*}a_i + \pi^k_\Omega$$
$$\geq \sum_{i\in\Omega^*}a_i + \frac{1}{k+1}\pi^*_\Omega \text{(Lemma)}$$
$$\geq \sum_{i\in\Omega^*}a_i + \frac{1}{k+1}\left(\pi^* - \sum_{i\in\Omega^*}a_i\right)\text{(Definition of }\Omega^*\text{)}$$
$$\geq \frac{1}{k+1}\pi^* + \frac{k}{k+1}\frac{\beta}{\beta+k+1}\pi^* = \frac{\beta+1}{\beta+k+1}\pi^*$$

-continued

Case 2: $\sum_{i \in \Omega^*} a_i < \frac{\beta}{\beta+k+1} \pi^*$

First, among all these β neighbors of s, there is at least one having sharing probability less than $$\frac{1}{\beta+k+1} \pi^*.$$

According to the definition of $\Omega^*$, i.e., all neighbors in $\Omega^*$ have higher sharing probability than others, all neighbors in $\pi_\Omega^k$ have $$a_i \leq \frac{1}{\beta+k+1} \pi^*.$$

$$\pi_\Omega^* \leq \pi_\Omega^{LP} \leq \pi_\Omega^k + \frac{k}{\beta+k+1} \pi_\Omega^*$$

where the last step follows from the upper bound of all k fractional values according to D. G. Luenberger, "Linear and Nonlinear Programming, Second Edition, Springer, September 2003. Therefore, $$\pi^* = \sum_{i \in \Omega^*} a_i + \pi_\Omega^* \leq \pi^\varepsilon + \frac{k}{\beta+k+1} \pi_\Omega^*$$

Then, $$\pi^\varepsilon \geq \frac{\beta+1}{\beta+k+1} \pi^* \geq \frac{\lceil \frac{k}{\varepsilon} \rceil - k}{\lceil \frac{k}{\varepsilon} \rceil} \pi^* \geq \frac{\frac{1}{\varepsilon}-1}{\frac{1}{\varepsilon}} \pi^* = (1-\varepsilon)\pi^*$$

where the second step follows from the fact that $$\frac{\beta+1}{\beta+k+1}$$

is monotonously increasing with respect to β.

Next it is shown that Algorithm 2 has the running time of $O(S_n^3/\varepsilon)$, where constant κ is the upper bound of the number of unwanted targets k.

Proof.

It is easy to see that the first phase has the running time at most $$S_n^{\lceil \frac{k}{\varepsilon} \rceil - (k+1)}.$$

For the second phase, LP (2) is solved $S_n^\beta$ times. According to N. Megiddo and A. Tamir, "Linear time algorithms for some separable quadratic programming problems," Operations Research Letters, 13:203-211, 1993, LP (2) $S_n^\beta$ can be solved in $O(S_n)$ when k is upper bounded by some constant κ. Hence, the overall running time of Algorithm 3 is $O(S_n^{\lceil \kappa/\varepsilon \rceil})$.

Thus, Algorithm 2 is PTAS.

Example

Algorithm 4 Feasibility of Solution

The probability that the rounded integral solution $x^I$ in Algorithm 4 leads to $\Sigma_{i \in N(s) \setminus T} a_i x_i \geq \delta \pi^*$ is larger than 0 where $\beta = \mu/2$ is shown as follows.

Proof.

The probability of infeasibility is shown to be less than 1. In particular, the infeasibility is two-fold: (1) any constraint is violated; (2) the solution is less than $\beta \pi^*$.

First, the probability that a constraint is violated is $$Pr[\text{constraint } j \text{ is violated}] = Pr\left[\sum_{i \in N(s) \setminus T} w_{ij} x^I > c_j\right] =$$

$$Pr\left[\mu \sum_{i \in N(s) \setminus T} w_{ij} x_i^L > c_j\right]$$

$$= Pr\left[\mu \sum_{i \in N(s) \setminus T} w_{ij} x_i^L > \left(1 + \frac{1-\mu}{\mu}\right) \mu c_j\right]$$

$$= Pr\left[\frac{\frac{\mu}{\max_i w_{ij}} \sum_{i \in N(s) \setminus T} w_{ij} x_i^L >}{\left(1 + \frac{1-\mu}{\mu}\right) \mu \frac{c_j}{\max_i w_{ij}}}\right] < (\mu e^{1-\mu})^{\hat{c}_j}$$

where the last step follows from equation (4) in the section entitled "Example: Algorithm 4 Feasibility of Solution"

since $\frac{w_{ij}}{\max_i w_{ij}} \in (0, 1]$.

Thus, the probability that any constraint is violated is upper bounded by $$1 - \prod_j \left[1 - (\mu e^{1-\mu})^{\hat{c}_j}\right] \leq 1 - \left[1 - (\mu e^{1-\mu})^{\hat{c}}\right]^k$$

since $(\mu e^{1-\mu})^{\hat{c}_j}$ monotonously increases with respect to $\hat{c}_j$.

Second, the probability that the solution is less than $\beta \pi^*$ is upper bounded as $$Pr[\pi < \beta \pi^*] = Pr\left[\sum_{i \in N(s) \setminus T} a_i x_i^I < \beta \pi^*\right]$$

$$= Pr\left[\mu \sum_{i \in N(s) \setminus T} a_i x_i^L < \beta \pi^*\right] \leq Pr\left[\mu \sum_{i \in N(s) \setminus T} a_i x_i^L < \beta \pi_{LP}^*\right]$$

$$= Pr\left[\mu \sum_{i \in N(s) \setminus T} a_i x_i^L < \left(1 - \frac{\mu-\beta}{\mu}\right) \mu \pi_{LP}^*\right]$$

$$\leq e^{-\mu \pi_{LP}^* \left(\frac{\mu-\beta}{\mu}\right)^2/2}$$

where the third step holds since the optimal solution of LP $\pi^*_{LP}$ is surely no less than the optimal solution $\pi^*$; the last step follows from equation (5) as well.

Therefore, when $\mu = \alpha(\pi^*_{LP}/k)^{1/(\hat{c}-1)}$ and $\beta = \mu/2$, the upper bound of infeasibility probability can be written as $$Pr[x^I \text{ is infeasible}] = 1 - \left[1 - (\mu e^{1-\mu})^{\hat{c}}\right]^k + e^{-\mu \pi_{LP}^* \left(\frac{\mu-\beta}{\mu}\right)^2/2}$$

$$= 1 - \left[1 - e^{\hat{c}(1+\ln \mu - \mu)}\right]^k + e^{-\mu \pi_{LP}^*/8}$$

$$= 1 - \left[1 - e^{\hat{c}(1+\ln \mu)}\right]^k + e^{-\mu \pi_{LP}^*/8}$$

$$\leq 1 - e^{-\eta k e^{\hat{c}(1+\ln \mu)}} + e^{-\mu \pi_{LP}^*/8} \leq 1$$

where the fourth step holds since the constant $\alpha < \frac{1}{2}$ exists such that $1 + \ln \mu > 1$ and $\hat{c} > 1$. Thus the rounded integral solution $x^I$ in Algorithm 4 leads to $\Sigma_{i \in N(s) \setminus T} a_i x_i \geq \beta \pi^*$ is larger than 0 where $\beta = \mu/2$.

Next, to illustrate a Chernoff-type bound, let $\lambda_1, \ldots, \lambda_n$ be the real numbers in $(0,1]$ and $X_1, \ldots, X_n$ be independent Bernoulli trials with $E[X_i] = p_i$. Then, consider the random variable $X = \Sigma_{i=1}^n \lambda_i X_i$, for any $\beta \geq 0$, $$Pr[x > (1+\delta)m] < \left[\frac{e^{\delta}}{(1+\delta)^{(1+\delta)}}\right]^m \quad (4)$$

and when $0 \leq \delta < 1$, $$Pr[x < (1-\delta)m] < e^{-m\delta^2/2} \quad (5)$$

where $m = E[X] = \Sigma_{i=1}^n \lambda_i p_i$.

Then, by using the method of conditional probability as described by P. Raghavan, "Probabilistic construction of deterministic algorithms: approximating packing integer problems," J. Comput. Syst. Sci., 37:130-143, October 1988, it is possible to derandomize the above randomized algorithm to obtain a deterministic solution and there exists a polynomial-time deterministic algorithm with expected size of CT at least $$\Omega\left(\left(\frac{OPT}{k}\right)^{\frac{1}{\hat{c}-1}}\right).$$

Proof. Because there is a probability larger than 0 that the rounded integral solution $x^I$ in Algorithm 4 leads to $\Sigma_{i \in N(s) \setminus T} a_i x_i \geq \delta \pi^*$ where $\beta = \mu/2$, there exists a solution with expected size of CT at least $$\Omega\left(\left(\frac{OPT}{k}\right)^{\frac{1}{\hat{c}-1}}\right).$$

Therefore, since $\pi^*_{LP} \geq OPT$, it is possible to derandomize the above randomized algorithm to obtain a deterministic solution.

Example

Inapproximability Results

The inapproximability of the theoretical bound $\Sigma_{i \in N(s) \setminus T} a_i x_i \geq \delta \pi^*$ is larger than 0 where $\beta = \mu/2$, illustrates that the theoretical guarantee is tight most of the time.

$$\Omega\left(\left(\frac{1}{k}\right)^{\frac{1}{\lfloor \hat{c} \rfloor + 1}}\right)$$

It can be shown that 2-MCT is hard to be approximated within a factor of unless NP=ZPP when $\hat{c} > 1$.

Proof.

In this proof, it is shown that the gap-preserving reduction from maximum independent set (MIS) problem to the 2-MCT, where MIS has been proven hard to be approximated into $n^{1-\epsilon}$ on general graphs unless NP=ZPP. Given an arbitrary instance $G = (V,E)$ of MIS with $|V| = n$ nodes and $|E| = m$ edges, an arbitrary positive constant z is used to construct the 2-MCT instance $I(G)$ as follows:

(1) a source node s and n neighbor nodes $N_i$ of s;

(2) $\binom{n}{\lfloor \hat{c} \rfloor + 1}$ unwanted targets $t_j$;

(3) from s to each of its neighbors, both the mention probability $p_{sN(s)}$ and sharing probability $a_{sN(s)}$ are set to 1;

(4) for each unwanted target $t_j$, edges are constructed from $v \in N(s)$ to it if v is in the $i^{th}$ combination of $\lfloor \hat{c} \rfloor + 1$ elements from all n neighbors of s. Moreover, the probability of all these edges are set either to $$1 - e^{\frac{1}{\lfloor \hat{c} \rfloor + 1}}$$

if all these nodes induce a clique in G and 0 otherwise. The leakage threshold of all unwanted targets are set to $$1 - e^{\frac{\lfloor \hat{c} \rfloor}{\lfloor \hat{c} \rfloor + 1}}.$$

Figure 11A:
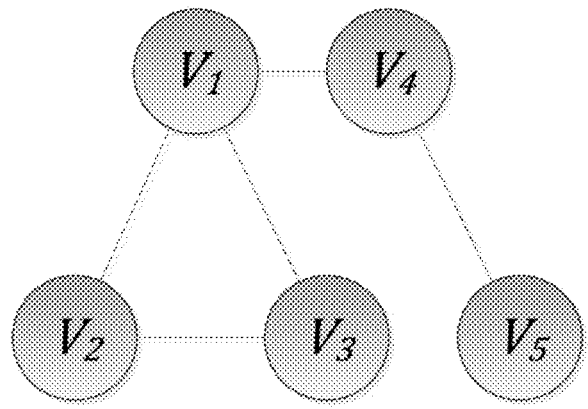
FIGS. 11A and 11B illustrate a reduction example from an Maximum Independent Set instance (FIG. 11A) to a 2-MCT instance (FIG. 11B); (z=2 and $$\tau = 1 - e^{\frac{2}{3}};$$
Figure 11B:
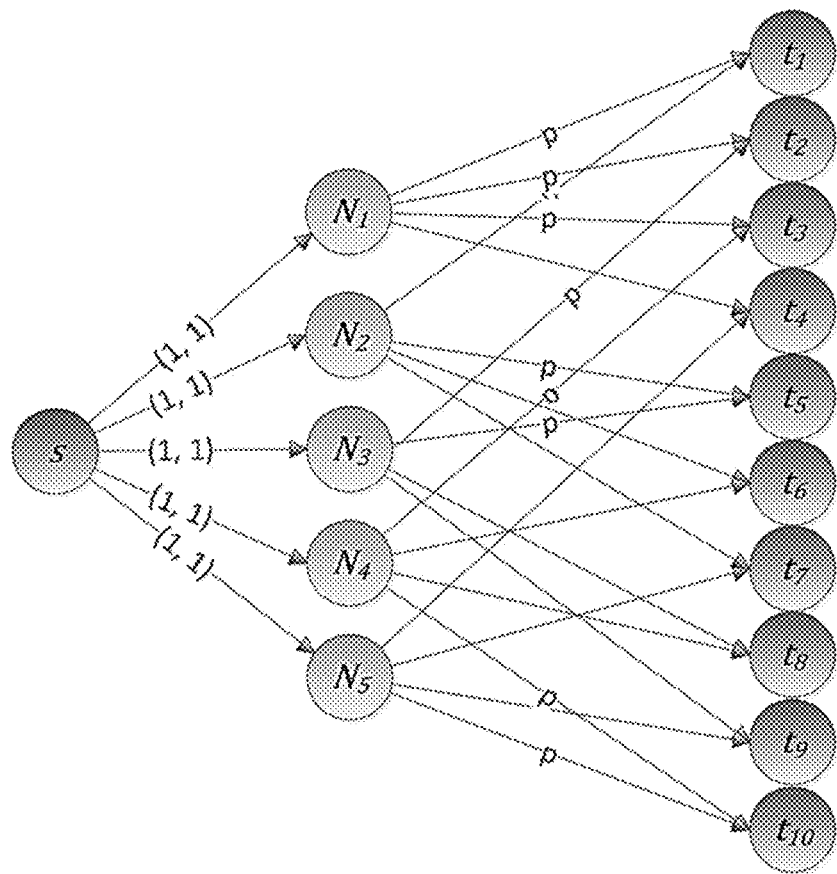

FIGS. 11A and 11B illustrate an example of this construction.

Then, let $\phi$ and $\Phi$ be feasible solutions of MIS on G and 2-MCT on $I(G)$. The completeness and soundness can be shown, respectively, given any positive number of edges m.

First, when $OPT(\phi) > m$, it si shown that $OPT(\Phi) > m$. Clearly, it is easy to see that all constraints are satisfied if the neighbors who belong to independent set of G are selected in $I(G)$. This is because for any unwanted target connecting from any of these nodes, there are only two cases:

1. All probabilities are 0 if the neighbor nodes of s connecting this unwanted target do not induce a clique in G;

2. Otherwise, only one neighbor node of s belong to any independent set of G since these neighbor nodes consist of a clique in G. Therefore, the constraint trivially satisfies in both cases.

Secondly, when $$OPT(\phi) < \frac{1}{n^{1-\epsilon}} m,$$

it can be shown that $$OPT(\varphi) < \frac{1}{O\left(k^{\frac{1}{\lfloor\hat{c}\rfloor+1}-\varepsilon'}\right)}m.$$

Consider the feasible solution $\Phi$ on $I(G)$, all constraints have to be satisfied. That is, the subgraph $G(\Phi)$ of $G$ consisting of the nodes in $\Phi$ has its maximum clique at most $\lfloor\hat{c}\rfloor+1$. Otherwise, at least one unwanted target will receive the message with probability 1 and therefore violate the constraint. Then, according to the following Lemma, the size of maximum independent set on $G(\Phi)$ is at least $$O\left(|\varphi|^{\frac{1}{\lfloor\hat{c}\rfloor}}\right).$$

Clearly, there is shown the size of maximum independent set on G being larger than $$O\left(|\varphi|^{\frac{1}{\lfloor\hat{c}\rfloor}}\right).$$

Therefore, $$O\left(|\varphi|^{\frac{1}{\lfloor\hat{c}\rfloor}}\right) < O\left(OPT(\varphi)^{\frac{1}{\lfloor\hat{c}\rfloor}}\right) < \frac{1}{n^{1-\varepsilon}}m$$

That is, $$OPT(\varphi) < \left[O\left(\frac{1}{n^{1-\varepsilon}}m\right)\right]^{\lfloor\hat{c}\rfloor} =$$

$$O\left(\left[O\left(\frac{1}{n^{1-\varepsilon}}m^{1-\frac{1}{\lfloor\hat{c}\rfloor}}\right)\right]^{\lfloor\hat{c}\rfloor}\right)m \leq O\left(\left[O\left(n^{\varepsilon-\frac{1}{\lfloor\hat{c}\rfloor}}\right)\right]^{\lfloor\hat{c}\rfloor}\right)m =$$

$$O\left(\frac{1}{n^{1-\varepsilon\lfloor\hat{c}\rfloor}}\right)m = O\left(\frac{1}{k^{\frac{1-\varepsilon\lfloor\hat{c}\rfloor}{\lfloor\hat{c}\rfloor+1}}}\right)m = O\left(\frac{1}{k^{\frac{1}{\lfloor\hat{c}\rfloor+1}-\varepsilon'}}\right)m$$

where $\varepsilon'=\varepsilon\lfloor\hat{c}\rfloor$ and the third inequality follows from the fact $m \leq n$.

Lemma:

Given a graph G with n nodes, if the size of maximum clique on G is less than any constant $\gamma$, the size of maximum independent set on G has to be at least $$O\left(n^{\frac{1}{\gamma-1}}\right).$$

Proof.

Assume that both the size of maximum clique on G is less than $\gamma$ and the size of maximum independent set on G is less than $n^{1/\gamma}$, the contradiction to the Ramsey's Theorem can be shown. Ramsey's Theorem states that for any s, t≥1, there is $R(s,t)<\infty$ such that any graph on $R(s,t)$ vertices contains either an independent set of size s or a clique of size t. In particular, $$R(s,t) \leq \binom{s+t-2}{s-1}.$$

According to the Ramsey's Theorem, under the assumption of the size of maximum clique and maximum independent set on G, the graph G has to contain less than $R(\gamma, O(n^{1/\gamma-1}))$ nodes. Therefore, G contains $\gamma+O(n^{1/\gamma-1})-2$ nodes. However, $$\gamma + O(n^{1/\gamma-1}) - 2\gamma - 1 = \left(\frac{e(\gamma + c_\gamma n^{1/\gamma-1} - 2)}{\gamma - 1}\right)^{\gamma-1} = n$$

where the constant $c_\gamma$ is certainly exists since the equation has order n and $\gamma$ is a constant. Thus the size of maximum independent set on G is at least $$O\left(n^{\frac{1}{\gamma-1}}\right).$$

Example

Proof: δ-MCT Problem is #P-Hard when δ≥3

Proof.
The reduction from the 3-Conn$_2$ problem will be shown and proven to be #P-hard.

The 3-Conn$_2$ can be defined as follows. Given a directed graph G with $|V|=n$ nodes and a probability $p(u,v)$ for each pair of nodes denoting the probability of u being able to connect to v. Let s and t be two terminals in G. 3-Conn$_2$ asks for the probability that there is a path from source s to destination t in G and the path has its length no larger than 3 hops.

First, for the reduction, the 3-Conn$_2$ problem can be polynomially solved if it is possible to determine that 3-Conn$_2$≤r'/r in a graph G for any integer r'≤r. Since each $p(u,v)$ in G is a rational number which can be represented by a numerator and a denominator which are integers, r can be defined to be the least common multiple of all the denominators such that a simple binary search from 1 to r can be finished within a polynomial time with respect to the input size.

Therefore, let G, s and t be an arbitrary instance of 3-Conn$_2$, then a polynomial time a graph G'=(V', E'), a source user s and a set of unwanted targets T along with their leakage thresholds $\tau_j$ is constructed for each of the unwanted targets such that if there is a polynomial-time algorithm to solve the δ-MCT problem on ther reduced instance, this algorithm can be applied to determine the upper bound of 3-Conn$_2$ problem on G.

As shown in FIG. 12, the construction is as follows. First, s'=s and T={t}. Then the sharing probability in each edge of G is set to be $1/|N(s)|+\epsilon_1$ where $$0 < \varepsilon_1 < \frac{1}{|N(s)|(|N(s)| - 1)}$$

and $|N(s)|$ is the number of neighbors of s. The mention probability is set to $p(i,j)$ in G for each edge. Then, a two-hop disjoint path is added between and t onto the graph G with the intermediate node u. Both edges (s,u) and (u,t) have the sharing probability to be 1. And $p_{su}=1$ and $p_{ut}=r'\leq r+\epsilon_2$ for any integer $r'\leq r$ and $\epsilon_2<1/r$. In addition, $T=\{t\}$ and its leakage threshold is set to $r'/r+\epsilon_2$.

Assume that A is a polynomial algorithm solving δ-MCT problem in the reduced instance illustrated in FIG. 12. Let's consider two cases:
- If A returns the circle of trust with size larger than 1, it is known that all neighbors of s in G except u is visible to the message. That is, the 3-Conn$_2$ in G, s and t is less than or equal to $r'/r$;
- If A returns the circle of trust with size equal to 1, that is, A selected only one neighbor u of s since the visibility $$\left(\frac{1}{|N(s)|}+\varepsilon_1\right)(|N(s)|-1)<1$$

when $$\varepsilon_1<\frac{1}{|N(s)|(|N(s)|-1)}$$

if only selecting N 1 neighbors of s in G. Clearly, 3-Conn$_2$ in G, s and t is larger than $r'/r$.

Thus, A can be used to decide if 3-Conn$_2$ is less than $r'/r$, implying that the δ-MCT problem is at least as hard as 3-Conn$_2$.

To prove the #P-hardness of 3-Conn$_2$, 3-Conn$_2$ is reduced from Counting Bipartite Independent Set (CBIS) problem which is defined as follows.

Given a bipartite graph G=(U,V;E), the problem asks for the total number of independent sets, where a subset of nodes is an independent set if no two nodes in this set are adjacent.

Proof.

In this proof, the 3-Conn$_2$ problem is reduced from the CBIS problem, which has been proven to be #P-hard by Provan et al. "The Complexity of Counting Cuts and of Computing the Probability that a Graph is Connected," *SIAM Journal on Computing*, 12(4):777-788, 1983. Let a graph G=(U,V;E) be an arbitrary instance of CBIS. There must be constructed in polynomial time a probabilistic graph G' and two terminals s, t such that if there exists a polynomial-time algorithm to solve the 3-Conn$_2$ problem on the reduced instance, this algorithm can be applied to solve CBIS problem on G.

The reduction is two phases: First, the probabilistic graph H is constructed by adding two terminals s and t onto G. Between s and each u∈U, there is added deg(u) number of edges where deg(u) is the degree of u in G. Similarly, between each v∈U and t, there is added deg(v) number of edges. And all edges in H have probability p with 0<p<1. Second, the probabilistic graph G' is constructed on H by replacing the multi-edges between each pair of nodes (u,v) with an edge of probability $1-(1-p)^\gamma$ where γ is the number of multi-edges between u and v. Note that the paths between s and t in G' are at most 3-hops. This reduction is depicted for an example in FIGS. 13A-13C.

Then it can first be shown that CBIS in G is equivalent to counting the minimum cardinality s−t cutsets in H. It is easy to see that the construction ensures that the s−t cutsets contain at least |E| edges. Also, it is clear that if there are deg(u)>1 edges between s and u, a minimum cutset includes either all or none of them. In addition, it is noted that (u,v) must not be an edge of G if both (s,u) and (v,t) are included in a minimum cut since it is possible to reduce the size of cutset by simply replacing the multi-edges in (s,u) and (v,t) with the edges incident to u and v in G, which contradicts that the cutset is minimum.

Therefore, suppose $I_u \cup I_v$ is an independent set in G where $I_u \subseteq U$ and $I_v \subseteq V$, the cutset consists of (s,u) for all u∈$I_u$, (v,t)∈$I_v$ for all v∈$I_v$, and all edges in E not incident to $I_u \cup I_v$. Conversely, suppose C is a minimum cutset in H, according to the above arguments, the endpoints (except s and t) incident to the edges in C\E forms an independent set in G.

Furthermore, it is easy to see that the probability that there is a path from s to t is the same in H and G' since only multi-edges in H are replaced in G' with simple edges with the same probability. If the 3-Conn$_2$ between s and t can be determined in G' (also H), this is suffices to computer the s−t pathset numbers. Thus, the minimum s t cutsets can be further counted using the pathset, implying that 3-Conn$_2$ is at least as hard as CBIS.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

It should be understood that the examples and embodiments described herein are for illustrative purposes only and that various modifications or changes in light thereof will be suggested to persons skilled in the art and are to be included within the spirit and purview of this application.

What is claimed is:

1. A computer-implemented method of controlling propagation of information posted on an online social network (OSN), the method comprising executing on a processor the steps of:
  receiving a message and an unwanted target for the message from a source user of the OSN;
  storing the message and the unwanted target on one or more computer readable media in operable communication with the processor;
  obtaining a friend/follower list associated with the source user on the OSN;
  constructing, from the friend/follower list and the unwanted target, a maximum circle of trust (MCT), the MCT comprising a largest set of trusted users of the OSN, wherein the MCT minimizes a probability that the message will be propagated to the unwanted target via the trusted users; and
  rendering the message on the OSN, wherein the message is visible on the OSN only to the trusted users indicated by the MCT,
  wherein constructing the MCT comprises executing on the processor the following steps:
  representing the source user's network as a directed graph with a tuple of probability <$a_{si}$, $p_{si}$>, where $a_{si}$ is a sharing probability from the source user s to a friend user i and each $a_{si}$ is defined as $$a_{si} = \frac{an_{si}Ad/ad_{si}}{Ad},$$

where $an_{si}$ represents a numerator of $a_{si}$, $ad_{si}$ represents a denominator of $a_{si}$ and $Ad$ is the least common multiple of all denominators $ad_{si}$;

performing phase 1 scaling by scaling $a_{si}$ by a factor A to provide a scaled sharing probability $$a'_{si} = \left\lfloor \frac{an_{si}}{A} \right\rfloor,$$

where $$A = \frac{\varepsilon \max\left\{ \frac{an_{si}Ad}{ad_{si}} \mid a_{si}p_{it} \leq \tau \right\}}{S_n},$$

$\varepsilon>0$, $\tau$ is a leakage probability to the unwanted user t, and $S_n$ is the number of friends i of the source user s; and performing phase 2 dynamic programming by performing a recursion function $L_i(a)$ for $a=1$ to $S_n$, $$L_i(a) = \begin{cases} L_{i-1}(a), & \text{if } a < a_i \\ \min\{L_{i-1}(a), L_{i-1}(a-a'_{si}) + w_i\}, & \text{if } a \geq a_i \end{cases}$$

where $L_i(a)$ is the minimum leakage probability of a subset of s's first i friends with a elide of trust $C_a$ having size equal to a and $w_i=-\log(1-a_{si}p_{it})$ corresponding to the neighbor i of s; and wherein the MCT is arg $\max_{1 \leq a \leq S_n}\{C_a | L(a) \leq \tau\}$.

2. A computer-implemented method of controlling propagation of information posted on an online social network (OSN), the method comprising executing on a processor the steps of:

receiving a message and an unwanted target for the message from a source user of the OSN;

storing the message and the unwanted target on one or more computer readable media in operable communication with the processor;

obtaining a friend/follower list associated with the source user on the OSN;

constructing, from the friend/follower list and the unwanted target, a maximum circle of trust (MCT), the MCT comprising a largest set of trusted users of the OSN, wherein the MCT minimizes a probability that the message will be propagated to the unwanted target via the trusted users; and rendering the message on the OSN, wherein the message is visible on the OSN only to the trusted users indicated by the MCT, wherein constructing the MCT comprises executing on the processor the following steps:

representing the source user's network as a directed graph with a tuple of probability $\langle a_{si}, p_{si}\rangle$, where $a_{si}$ is a sharing probability from the source user s to a friend user i, $T=\{t_1, \ldots, t_k\}$ is the set of $k=|T|$ unwanted targets, and the source user s has $|N(s)\backslash T|=S_n$ neighbors;

for a threshold $$\beta = \min\left\{ \left\lceil \frac{k}{\varepsilon} \right\rceil - (k-1), |N(s) \backslash T| \right\}$$

with k unwanted targets:

(1) when the number of visible neighbors of s is less than $\beta$, performing an enumeration to provide a feasible solution $\pi$ that induces a maximum visibility; and (2) starting with the feasible solution as a current optimal solution, checking each combination of size $\beta$, wherein for each combination $\Omega$:

obtaining a bounded solution $\pi_\Omega$ in terms of a neighbor set $N(s)'=\{i|a_i \leq \min i \in Q\}$ and $c_j'=c_j-\Sigma_{i \in \Omega}w_{ij}$ by using $$\max \sum_{i \in N(s) \backslash T} a_i x_i$$

$$\text{s.t.} \sum_{i \in N(s) \backslash T} w_{ij} x_i \leq c_j, \forall j \in T$$

$$x_i \geq 0$$

where $w_{ij}=-\log(1-a_{si}p_{it_j})$ and $c_j=-\log(1-\tau_j)$;

and updating the current optimal solution if $\Sigma_{i \in \Omega}a_i + \pi_\Omega > \pi$.

3. A computer-implemented method of controlling propagation of information posted on an online social network (OSN), the method comprising executing on a processor the steps of:

receiving a message and an unwanted target for the message from a source user of the OSN;

storing the message and the unwanted target on one or more computer readable media in operable communication with the processor;

obtaining a friend/follower list associated with the source user on the OSN;

constructing, from the friend/follower list and the unwanted target, a maximum circle of trust (MCT), the MCT comprising a largest set of trusted users of the OSN, wherein the MCT minimizes a probability that the message will be propagated to the unwanted target via the trusted users; and rendering the message on the OSN, wherein the message is visible on the OSN only to the trusted users indicated by the MCT, wherein constructing the MCT comprises executing on the processor the following steps:

representing the source user's network as a directed graph with a tuple of probability $\langle a_{si}, p_{si}\rangle$, where $a_{si}$ is a sharing probability from the source user s to a friend user i, $T=\{t_1, \ldots, t_k\}$ is the set of $k=|T|$ unwanted targets, and the source user s has $|N(s)\backslash T|=S_n$ neighbors;

given $$\beta \leftarrow \min\left\{ \left\lceil \frac{k}{\varepsilon} \right\rceil - (k+1), |N(s) \backslash T| \right\};$$

$$w_{ij} \leftarrow -\log(1 - p_{si}p_{it_j});$$

$$c_j \leftarrow -\log(1 - \tau_j);$$

performing a first phase comprising:

```
foreach Λ ⊂ N(s) \ T such that |Λ| < β do
|   if Σ_{i∈Λ} w_{ij} ≤ c_j for all j ∈ T then
|   |   if Σ_{i∈Λ} a_i > π^ε then
|   |   |   C ← Λ;
|   |   end
|   end
end                                              ; and
``` performing a second phase comprising:

```
foreach Ω ⊂ N(s) \ T such that |Ω| = β do
|   if Σ_{i∈Ω} w_{ij} ≤ c_j then
|   |   Obtain the solution C_Ω^k of the subproblem with
|   |   N(s)' = {j|c_j ≤ min{c_i|i ∈ Ω}} \ Ω and
|   |   c_j' = Σ_{i∈Ω} w_{ij} using Algorithm 3 ;
|   |   if Σ_{i∈Ω∪C_Ω^k} a_i > π^ε then
|   |   |   C ← Ω ∪ C_Ω^k;
|   |   end
|   end
end
return C;
``` where $\tau_j$ is a leakage probability for each $t_j \in T$, and the circle of trust C is the MCT, wherein using the Algorithm 3 comprises:

obtaining an optimal basic solution $x^{LP}$ by solving LP (2) with $|\{i | 0 < x_i^{LP} < 1\}| \le k$, where $I \leftarrow \{i | x_i^{LP} = 1\}$ and $F \leftarrow \{i | 0 < x_i^{LP} < 1\}$, and

```
if Σ_{i∈I} a_i > max{a_j | j ∈ F} then
|   C_I ← I;
end
else
|   C_I ← {j};
end
return C_I;
``` where $C_1$ is an intermediate circle of trust, wherein LP (2) is:

$$\max \sum_{i \in N(s) \setminus T} a_i x_i$$

$$\text{s.t.} \sum_{i \in N(s) \setminus T} w_{ij} x_i \le c_j, \forall j \in T$$

$$x_i \ge 0$$

where $w_{ij} = -\log(1 - a_{si} p_{it_j})$ and $c_j = -\log(1 - \tau_j)$.

4. A computer-implemented method of controlling propagation of information posted on an online social network (OSN), the method comprising executing on a processor the steps of:

receiving a message and an unwanted target for the message from a source user of the OSN;

storing the message and the unwanted target on one or more computer readable media in operable communication with the processor;

obtaining a friend/follower list associated with the source user on the OSN;

constructing, from the friend/follower list and the unwanted target, a maximum circle of trust (MCT), the MCT comprising a largest set of trusted users of the OSN, wherein the MCT minimizes a probability that the message will be propagated to the unwanted target via the trusted users; and rendering the message on the OSN, wherein the message is visible on the OSN only to the trusted users indicated by the MCT, wherein constructing the MCT comprises executing on the processor the following steps:

representing the source user's network as a directed graph with a tuple of probability $\langle a_{si}, p_{si} \rangle$, where $a_{si}$ is a sharing probability from the source user s to a friend user i, $T = \{t_1, \ldots, t_k\}$ is the set of $k = |T|$ unwanted targets, $\tau_j$ is a leakage probability for each $t_j \in T$ and the source user s has $|N(s) \setminus T| = S_n$ neighbors;

obtaining a solution $x^L$ of LP(2), wherein LP(2) is $$\max \sum_{i \in N(s) \setminus T} a_{si} x_i$$

$$\text{s.t.} \sum_{i \in N(s) \setminus T} w_{ij} x_i \le c_j, \forall j \in T$$

$$x_i \ge 0$$

where $w_{ij} = -\log(1 - a_{si} p_{it_j})$ and $c_j = -\log(1 - \tau_j)$, and rounding each $x^I$ to 1 with a probability $\mu x^L$ with $\mu = \alpha(\pi^*_{LP}/k)^{1/(\delta-1)}$ where $\alpha < \frac{1}{2}$ and $\pi^*_{LP}$ is an optimal fractional solution of LP(2), and $$\hat{c} = \min_j \frac{\log(1 - \tau_j)}{\max_i \log(1 - a_{si} p_{it_j})},$$

wherein the MCT is $\{i | x_i^I = 1\}$.

5. A computer-implemented method of controlling propagation of information posted on an online social network (OSN), the method comprising executing on a processor the steps of:

receiving a message and an unwanted target for the message from a source user of the OSN;

storing the message and the unwanted target on one or more computer readable media in operable communication with the processor;

obtaining a friend/follower list associated with the source user on the OSN;

constructing, from the friend/follower list and the unwanted target, a maximum circle of trust (MCT), the MCT comprising a largest set of trusted users of the OSN, wherein the MCT minimizes a probability that the message will be propagated to the unwanted target via the trusted users; and rendering the message on the OSN, wherein the message is visible on the OSN only to the trusted users indicated by the MCT, wherein constructing the MCT comprises executing on the processor the following steps:

iteratively adding one of the user's neighbors into the circle of trust until no further neighbors can be added without causing a leakage probability to exceed a threshold where in each iteration, the set of candidate neighbors L, those whose addition to CT still guarantees that the leakage levels at each unwanted targets $t_j$ does not exceed the threshold $\tau_j$ is updated, wherein a $l_j(C)$ is the probability that the message will be leaked to $t_j$, and v is a candidate if $l_j(C+\{v\}) \leq \tau_j \forall j=1\ldots k$, where $f(v)$ is used to evaluate the fitness of user v $$f(v) = \frac{a_{sv}}{\max_{t_j \in T} \frac{l_j^{(v)} \left( \sum_{u \in L} l_j^u - l_j^{(v)} \right)}{1 - l_j^{(v)}}}$$

where $l_j^{(v)} = l_j(C+\{v\})/\tau_j$ is the normalized leakage level at $t_j$ after adding v to the CT and $1-l_j^{(v)}$ is the remaining leakage tolerance at the unwanted target $t_j$; $\Sigma u_{\in L} l_j^u - l_j^{(v)}$ reflects the future potential leakage to target $t_j$ when adding user v to CT.

6. A computer-implemented method of controlling propagation of information posted on an online social network (OSN), the method comprising executing on a processor the steps of:
 receiving a message and an unwanted target for the message from a source user of the OSN;
 storing the message and the unwanted target on one or more computer readable media in operable communication with the processor;
 obtaining a friend/follower list associated with the source user on the OSN;
 constructing, from the friend/follower list and the unwanted target, a maximum circle of trust (MCT), the MCT comprising a largest set of trusted users of the OSN, wherein the MCT minimizes a probability that the message will be propagated to the unwanted target via the trusted users; and
 rendering the message on the OSN, wherein the message is visible on the OSN only to the trusted users indicated by the MCT,
 wherein constructing the MCT comprises executing on the processor the following steps:
 representing the source user's network as a directed graph G=(V,E) with propagation probabilities p(u,v) for (u,v) ∈E, where T={$t_1, \ldots, t_k$} is the set of k=|T| unwanted targets in V, where $\tau_j$ is a leakage probability for each $t_j \in T$ and the source user s has |N(s)\T|=$S_n$ neighbors;
 initiating a circle of trust C as 0 and a Layer L as N(s)\T;
 removing all unwanted targets T with no risk of leakage by performing:

```
foreach t_j ∈ T do
|    if τ_j(L) < τ_j then
|    |    T ← T \ {t_j};
|    end
end                                         ;
```

```
while ∀l_j(C) < τ_j, update the set of candidate users by performing:
|    foreach v ∈ L do
|    |    if ∃j : l_j(C + {v}) > τ_j then
|    |    |    L ← L \ {v};
|    |    end
|    end
|    Find v ∈ L that maximized f(v);
|    C ← C ∪ {v};
end
return C                                    ;
``` wherein C provides the MCT.

7. The method according to claim 6, wherein estimate leakage $\tau_j(C)$ is obtained using a non-sampling method comprising:

```
foreach v ∈ V do
|    Compute d(s, v) and d(v, t) the hop
|    distance from s to v and from v to t,
|    respectively;
end
Let d_0 = d(s, t);
for i = 1 to d_0 do do
|    C_i ← {(u, v) | d_s(u) = i ∧ d_s(u) + d_t(v) ≤
|    δ - 1}
end
return 1 - Π_{i-1}^δ (1 - Π_{e∈C_i})          ,
``` where layers of vertices are constructed using a Breadth-First Search algorithm such that layer $L_i$ consists of vertices at distance i from the source in term of hops, wherein cutset $C_i$ is constructed by including all edges (u,v) with u∈$L_i$ and v∈$L_{i+1}$ but only if $d_s(u)+d_t(v) \leq \delta-1$, where δ is number of hops.

8. The method according to claim 7, wherein the estimate leakage $\tau_j(C)$ is further obtained by, after performing the non-sampling method,
 sorting the neighbors that are not included in the CT in non-decreasing order of their visibilities;
 following the non-decreasing order, including each neighbor into the CT and checking if the leakage is below a threshold using a Sampling algorithm; and
 if the leakage is below the threshold adding the neighbor to the CT; else not adding the neighbor to the CT.

9. A system for controlling propagation of information posted on an online social network (OSN), the system comprising:
 one or more computer readable media;
 a processor in operable communication with the one or more computer readable media;
 computer-executable instructions stored on the one or more computer readable media that, when executed by the processor, direct the processor to:
 render, to a source user of the OSN, a user interface for indicating an unwanted target for a message on the OSN;
 receive an indication of the unwanted target for the message on the OSN;
 store the message and the unwanted target on the one or more computer readable media;
 obtain, from the OSN, a friend/follower list associated with the source user on the OSN;
 construct, from the friend/follower list and the unwanted target, a maximum circle of trust (MCT), the MCT comprising a largest set of trusted recipients of the message on the OSN, wherein the MCT minimizes a probability that the message will be propagated to the unwanted target via the trusted recipients; and
 transmit the message on the OSN only to the trusted recipients indicated by the MCT.

10. The system according to claim 9, wherein constructing the MCT further comprises computer-executable instructions stored on the one or more computer readable media that, when executed by the processor, direct the processor to:
 represent the source user's network as a directed graph with a tuple of probability <$a_{si}, p_{si}$>, where $a_{si}$ is a sharing probability from the source user s to a friend user i and each $a_{si}$ is defined as $$a_{si} = \frac{an_{si} Ad/ad_{si}}{Ad},$$

where $an_{si}$ represents a numerator of $a_{si}$, $ad_{si}$ represents a denominator of $a_{si}$, and Ad is the least common multiple of all denominators $ad_{si}$;

perform phase 1 scaling by scaling $a_{si}$ by a factor A to provide a scaled sharing probability $$a'_{si} = \left\lfloor \frac{an_{si}}{A} \right\rfloor,$$

where $$A = \frac{\varepsilon \max\left\{ \frac{an_{si} Ad}{ad_{si}} \mid a_{si} p_{it} \leq \tau \right\}}{S_n},$$

$\epsilon > 0$, $\tau$ is a leakage probability to the unwanted user t, and $S_n$ is the number of friends i of the source user s; and perform phase 2 dynamic programming by performing a recursion function $L_i(a)$ for a=1 to $S_n$, $$L_i(a) = \begin{cases} L_{i-1}(a), & \text{if } a < a_i \\ \min\{L_{i-1}(a), L_{i-1}(a - a'_{si}) + w_i\}, & \text{if } a \geq a_i \end{cases}$$

where $L_i(a)$ is the minimum leakage probability of a subset of s's first i friends with a circle of trust Ca having size equal to a and $w_i = -\log(1 - a_{si} p_{it})$ corresponding to the neighbor i of s; and wherein the MCT is $\arg \max_{1 \leq a \leq S_n} \{C_a | L(a) \leq \tau\}$.

* * * * *